US012345089B2

(12) United States Patent
Guest

(10) Patent No.: US 12,345,089 B2
(45) Date of Patent: Jul. 1, 2025

(54) PRIVACY-SECURITY DEVICE

(71) Applicant: GUEST PRECISION MACHINING, INC., Hull, GA (US)

(72) Inventor: Glenn Allen Guest, Hull, GA (US)

( * ) Notice: Subject to any disclaimer, the term of this patent is extended or adjusted under 35 U.S.C. 154(b) by 0 days.

(21) Appl. No.: 18/535,373

(22) Filed: Dec. 11, 2023

(65) Prior Publication Data

US 2024/0125169 A1 Apr. 18, 2024

Related U.S. Application Data

(63) Continuation-in-part of application No. 18/380,280, filed on Oct. 16, 2023.

(60) Provisional application No. 63/547,812, filed on Nov. 8, 2023, provisional application No. 63/464,405, filed on May 5, 2023, provisional application No. 63/454,894, filed on Mar. 27, 2023, provisional application No. 63/416,817, filed on Oct. 17, 2022.

(51) Int. Cl.
*E06B 5/10* (2006.01)
*E05C 1/10* (2006.01)
*E05F 1/12* (2006.01)
*E06B 7/30* (2006.01)

(52) U.S. Cl.
CPC .................. *E06B 5/10* (2013.01); *E05C 1/10* (2013.01); *E05F 1/12* (2013.01); *E06B 7/30* (2013.01); *E05Y 2900/132* (2013.01)

(58) Field of Classification Search
CPC ...... E06B 5/106; E06B 5/10; E06B 7/28–367; E05F 1/12; E05Y 2900/132
See application file for complete search history.

(56) References Cited

U.S. PATENT DOCUMENTS 1,641,044 A * 8/1927 Murphy .................... E06B 7/30 49/386
3,203,052 A * 8/1965 Curtis, Jr. ................. E06B 7/30 49/70
4,763,444 A * 8/1988 Ritchie ...................... E06B 7/30 359/511
5,001,810 A * 3/1991 Baer ....................... E05D 3/122 16/302
5,004,286 A * 4/1991 Taylor, III .............. B60R 21/12 109/9
5,141,268 A * 8/1992 Keller ................... E05B 17/005 292/169.14
5,579,605 A * 12/1996 Tanaka ...................... E06B 7/32 49/171

(Continued)

FOREIGN PATENT DOCUMENTS

CN 112796832 A * 5/2021 ............. E05B 15/00
GB 2221945 A * 2/1990 ............... E06B 7/30

*Primary Examiner* — Daniel P Cahn
*Assistant Examiner* — Patrick B. Ponciano
(74) *Attorney, Agent, or Firm* — Smith Tempel Blaha LLC; Matthew T. Hoots

(57) ABSTRACT

A security device that can be activated or deactivated on the interior side of a door or window or other passageway barricade, and that can be activated or deactivated on the exterior side of the door with a special mechanism, such as a key, tool, transmitter, etc. The security device may be mounted to the hinge-side of a door, the knob-side of a door or in a scenario that includes a non-mullion double door, to the two adjoining portions of the doors at the middle joint.

3 Claims, 30 Drawing Sheets

(56) References Cited

U.S. PATENT DOCUMENTS

| | | | | | |
|---|---|---|---|---|---|
| 5,606,773 | A * | 3/1997 | Shappell | E05F 1/123 49/386 |
| 5,991,975 | A * | 11/1999 | Baer | E05D 7/009 16/354 |
| 6,308,474 | B1 * | 10/2001 | Wilson | E06B 3/88 52/103 |
| 6,871,821 | B2 * | 3/2005 | Takahama | B64C 1/1469 89/36.01 |
| 8,850,949 | B1 * | 10/2014 | Lopez | F41H 5/24 89/36.02 |
| 9,243,445 | B2 * | 1/2016 | Beaudoin | E06B 7/30 |
| 9,316,467 | B2 * | 4/2016 | Tunis, III | F41H 5/0471 |

* cited by examiner

PRIVACY-SECURITY DEVICE

CROSS-REFERENCE TO RELATED APPLICATIONS

This is a utility patent application being filed in the United States as a non-provisional application for patent under Title 35 U.S.C. § 100 et seq. and 37 C.F.R. § 1.53(b) and, claiming the benefit of the prior filing date under Title 35, U.S.C. § 119(e) of the United States provisional application for patent that was filed on Nov. 8, 2023 and assigned Ser. No. 63/547,812, and further this application is a continuation-in-part of the United States non-provisional application filed on Oct. 16, 2023 and assigned Ser. No. 18/380,280, which application claims priority under Title 35, U.S.C. § 119(e) of the following United provisional applications:

Ser. No. 63/416,817 filed on Oct. 17, 2022;

Ser. No. 63/454,894 filed on Mar. 27, 2023; and

Ser. No. 63/464,405 filed on May 5, 2023. All of the above-identified application are hereby incorporated herein by reference in their entireties.

BACKGROUND

Active shooter and other emergency scenarios have become all too common in today's schools. In such scenarios, faculty and students are taught to close the door to their classrooms and barricade themselves inside, among taking other actions. Additional security devices on the doors (beyond a typical lockset and deadbolt) that increase the security provided by the door may be desirable to mitigate the chances that the door may be forcefully opened from the exterior. However, once the emergency is removed or neutralized, or if other scenarios arise (i.e., smoke, fire, injuries, chemical issues), authorities or medical personnel may need a means by which the locking mechanisms of any additional security device can be disengaged, or overridden, from the exterior of the door. This is particularly important when the persons on the interior of the door are in peril, incapacitated, injured, etc. Thus, it is necessary to provide a mechanism for emergency personnel to open any barricades from the exterior without requiring any person inside the barricaded room to take action.

In countless situations, the mechanisms that were intended to bring safety to occupants behind a door wound up trapping the occupants in a building, inaccessible to first responders or others that were attempting to help or rescue the occupants. The triangle shirtwaist factory fire is one of the most horrific events that identified how problematic it is in attempting to balance security yet providing safe egress of a building. In this tragic event in Manhattan NY on Mar. 25, 1911, 146 workers were killed in a rapidly spreading fire. One of the problems that exasperated this tragedy was that to prevent the theft of equipment in the factory, managers had locked many of the exit doors. When the fire broke out, the workers were not able to make a quick exit and others were not able to come to the rescue of the workers. An integral element of the NFPA101: Life Safety Code is the provision of free egress, which means that occupants must be able to exit a building without the use of any keys, tools, special knowledge, or effort.

Further, oftentimes a feature of a barricade that is provided to assist first responders or simply for other very logical reasons may also work to place individuals behind the barricade in peril. For instance, typical doors to a school classroom include a small window to allow people to determine an opportune time to open the door and thus minimize disturbance to the classroom activity. These windows also assist first responders to determine if people are inside a room and need to be rescued. In a commercial or business setting, similar logical arguments are made. However, in both scenarios, a perpetrator is also able to take advantage of a window to look for victims or simply to shoot a gun through the window at potential victims.

Therefore, there is a need in the art for a new and novel door security device that addresses the above articulated needs in the art as well as other needs.

SUMMARY

The present invention relates to systems and methods for door security and window blockage/privacy and, more particularly, to a novel security device that (a) can be used to secure, or to further secure, an ingress barricade but, that provides free and easy egress to the inhabitants and the ability for necessary personnel to disengage the security device from the exterior of the barricade and (b) that can prevent a perpetrator from looking through a window in the barricade to identify and target potential victims.

Security Device.

In some embodiments, the security device can further be used to mount a door to a door jamb or casing and to operate as a door hinge in one mode of operation and/or to operate as a securing lock in another mode of operation. In one embodiment, the device is mounted to the hinge-side of a door jamb/casing such that when the door is closed a user may engage a bolt of the security device to prevent forceful opening of the door from the exterior. Embodiments of the solution may include a disengaging means that is accessible from the exterior of the door.

Exemplary embodiments of a novel, hinge-side door security device are disclosed. Embodiments of the solution are configured such that a user may quickly engage a locking mechanism on the interior side of a door that provides an additional level of security beyond an existing lockset and/or deadbolt. Advantageously, the locking mechanism of the hinge-side door security device may be disengaged from outside the door via a unique key or tool configured to access the locking mechanism through an aperture in the door.

One embodiment includes a security device for locking a passageway barricade, which could be a door, a panel, a window, a trap door, etc. The security device includes a latching element coupled to an interior surface of a moveable element (i.e., a door) of the passageway barricade. The latching element has a sliding bolt and an actuator. The actuator is utilized to transition the sliding bolt between a locked state and an unlocked state. The security device also includes a receiving element coupled to an interior surface of an element of the passageway barricade other than the moveable element, such as a door jamb or, in the case of a non-mullion double door, the other door. The receiving element receives the sliding bolt when the sliding bolt transitions to the locked state.

The various embodiments of the security device also include a safety release that is accessible from a port in an exterior surface of the moveable element of the passageway barricade. The port provides access to the actuator such that the sliding bolt can be transitioned from a locked state to an unlocked state from someone on the exterior side of the door, such as law enforcement, first responders, medics, etc.

In some embodiments, the passageway barricade is a door and the latching element is coupled to the interior surface of the door and on the hinge-side edge while the receiving element is attached to a doorjamb adjacent to the hinge-side edge of the door. In such embodiments the latching element includes a pin and the receiving element includes an upper and lower barrel. In other embodiments the latching element includes a first barrel and the receiving element includes two additional barrels. In such embodiments the barrel of the latching element can be slid between the barrels of the receiving element and secured with a pin or other mechanism to create a barrel hinge structure. When the latching element is connected to the receiving element, the latching element can rotate like a hinge relative to the receiving element. Further, the pin defines an aperture passing through the pin. To transition the security device to the locked state, the sliding bolt, or a portion of the sliding bolt is slid through the aperture of the pin.

In other embodiments, the passageway barricade is a door and the latching element is coupled to the interior surface of the door on the knob-side edge while the receiving element is attached to a doorjamb adjacent to the knob-side edge of the door. The receiving element includes an aperture for receiving the sliding bolt when the sliding bolt is in a locked state.

In yet other embodiments, the passageway barricade is a non-mullion double door and the latching element is coupled to the interior surface of a first door of the double door on the knob-side edge while the receiving element is attached to a second door of the non-mullion double door adjacent to the knob-side edge of the first door. Similar to the other embodiments, the receiving element includes an aperture for receiving the sliding bolt when the sliding bolt is in a locked state. Further, in this embodiment the slide bolt includes a plurality of grooves around the circumference of the slide bolt. The aperture defined by the receiving element also includes a plurality of grooves on the inner surface of the aperture that are parallel to the grooves on the slide bolt. Upon applying pressure to open the non-mullion double door, the grooves of the slide bolt and the grooves of the aperture of the receiving element engage with each other to prevent the slide bolt from exiting the aperture.

In the various embodiments, the actuator may be a rack and pinion mechanism, wherein when the pinion is rotated, a rack associated with the sliding bolt is forced to move the sliding bolt.

Privacy Device.

The present invention relates to systems and methods for door security and, more particularly, to a novel security device configured to be mounted to a door such that a user may actuate the security device to cover a window of the door in order to prevent forceful opening of the door from the exterior by compromise of the window.

Active shooter and other emergency scenarios have become all too common in today's schools. In such scenarios, faculty and students are taught to close the door to their classrooms and barricade themselves inside, among taking other actions. Additional security devices on the doors (beyond a typical lockset and deadbolt) that increase the security provided by the door may be desirable, in order to mitigate the chances that the door may be forcefully opened from the exterior.

Therefore, there is a need in the art for a new and novel door security device that addresses the above articulated needs in the art as well as other needs.

Exemplary embodiments of a novel device for securing a window in a door are disclosed. Embodiments of the solution may be configured such that the default state is a "fail-open" state that leaves the window unobstructed. The fail-open state may be accomplished via spring-loaded hinges that default to keep a window covering plate of the security device mated to the door surface as opposed to over the window. When necessary, a user may quickly engage window security device by rotating the window covering plate from the "fail-open" position to a "closed and secure" position over the window. Advantageously, spring loaded release devices may be mounted next to the window and configured to retract from a default extended state when presented with the window covering plate and then return back to the default extended state to securely hold the window covering plate over the door window and prevent it from returning to its default fail-open state. Subsequent retraction of the spring loaded release devices may allow the window covering plate to return to its fail-open state, thereby exposing the window.

These and other embodiments are be described in greater detail below in connection with the presentment of the various drawings of presented embodiments of the invention.

DETAILED DESCRIPTION

Figure 1A:
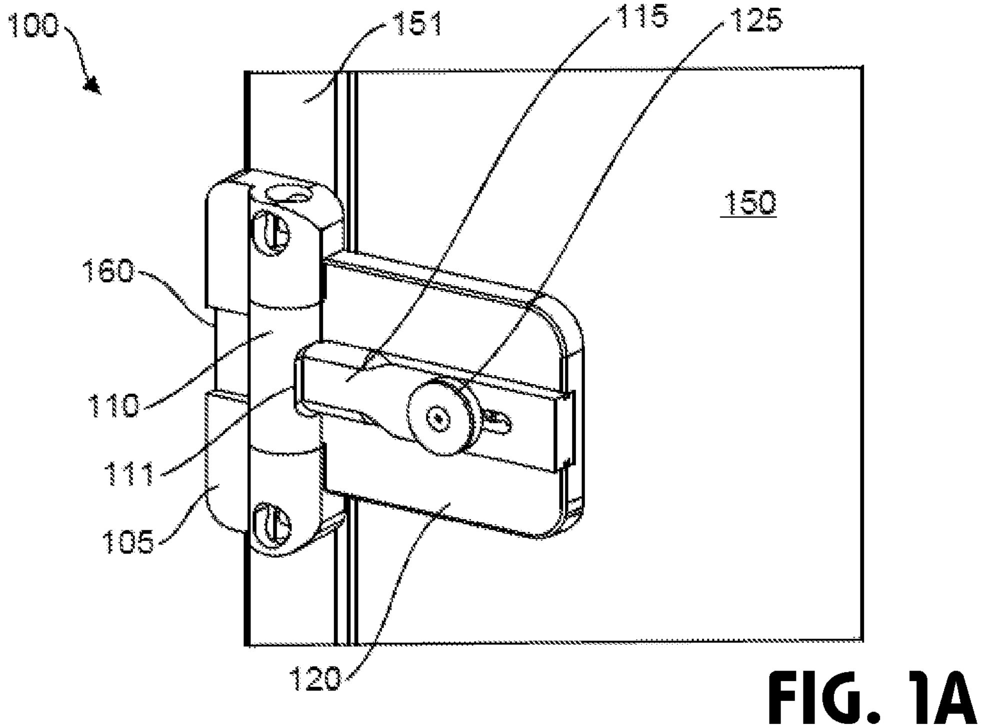
FIG. 1A is a conceptual diagram of an exemplary embodiment of a door security device in an unlocked state.

Various embodiments, aspects and features of the present invention encompass a security device that can be activated or deactivated by hand on the interior side of a door or window or other passageway barricade, and that can be activated or deactivated on the exterior side of the door with a special mechanism, such as a key, tool, transmitter, fob, etc. The various embodiments of the door security device may be mounted to the hinge-side of the door, the knob-side of the door, both the hinge-side and knob-side of the door, or in a scenario that includes a non-mullion double door, to the two adjoining portions of the doors at the middle joint. Further configurations and advantages and uses of the door security device will occur to those of skill in the art reviewing the figures and description that follows. While the present invention and embodiments thereof are described in terms of a door security device, it should be understood that the various embodiments of the present invention may also find use in other applications, such as windows, safe rooms, sliding doors, garage doors, trap doors, hidden doors, public restrooms, businesses, etc.

In general, an exemplary embodiment of the security device includes a sliding bar/latch and a receiver. Depending on the particular embodiment, the security device can be mounted to the interior side of a door, either on the hinge-side edge of the door or the knob-side edge of the door. The sliding bar/latch may be mounted to the surface of the door and the receiver may be mounted to the doorjamb or mullion adjacent to the sliding bar/latch. In operation, when the door is in a closed position, the sliding bar/latch can be actuated to cause the bar to slide into the receiver and thus secure the door into the locked position. The back side of the sliding bar/latch includes an actuator interface that can be used to activate or deactivate the sliding bar/latch. An aperture is created through the door to give access to this actuator interface from the exterior side of the door. To prevent the security device from being rendered useless or easily unlocked, a special tool or electronic signal is required to control the interface of the sliding bar/latch externally through the aperture.

Various embodiments, aspects and features of the present invention also in lieu of or in addition to, encompass a hinged privacy panel that can be attached proximate to a window existing on a door. The hinged privacy panel can be activated or deactivated by hand on the interior side of a door, window or other passageway barricade, and that can be activated or deactivated on the exterior side of the door with a special mechanism, such as a key, tool, transmitter, fob, etc.

Further details, aspects, and operations of the various embodiments of the security device and the privacy panel will be presented below in connection with the description of the drawings, in which like labels represent like elements throughout the various view.

Security Device.

FIG. 1A is a conceptual diagram of an exemplary embodiment of a door security device in an unlocked state. The illustrated embodiment is for mounting on the hinge-side edge of the interior surface of a door and the interior doorjamb adjacent to the hinge-side edge of the door. As can be understood from the illustration, the solution is based on a pin and barrel design. The door security device 100 includes a receiver or barrel component 105 that is securely mounted to the interior surface of a doorjamb/casing 151 that is adjacent or proximate to the hinge-side edge of the door. In many applications, such as in schools and commercial buildings, the jamb/casing 151 may be comprised of steel but, other materials such as wood, wood and sheetrock, etc. may also receive the barrel component 105. A latch assembly 122 includes a barrel/pin component 110 that is rotatably coupled to the barrel component 105 such that the security device 100 may swing or hinge between an open position and a closed position, similar to a barrel hinge, as would be understood by one of ordinary skill in the art. Advantageously, this embodiment of the door security device can also operate as a hinge for the door. Multiple door security devices can be installed in addition to or in lieu of regular hinges.

The latch assembly 122 includes a leaf plate 120 that extends from the barrel/pin component 110 and is configured to be mounted or attached to the interior surface 152 of a door 150. A slide bolt 115 is slidably engaged within a channel 121 in the leaf plate 120. An actuator is utilized to move the slide bolt 115 from an unlocked position (FIG. 1A) to a locked position (FIG. 1). One embodiment for the slide bolt 115 actuator may be a rack and roller pinion actuator 125 (as described further in connection with FIG. 2). For example, the roller pinion engages with a rack that is interior to the slide bolt 115.

Figure 1B:
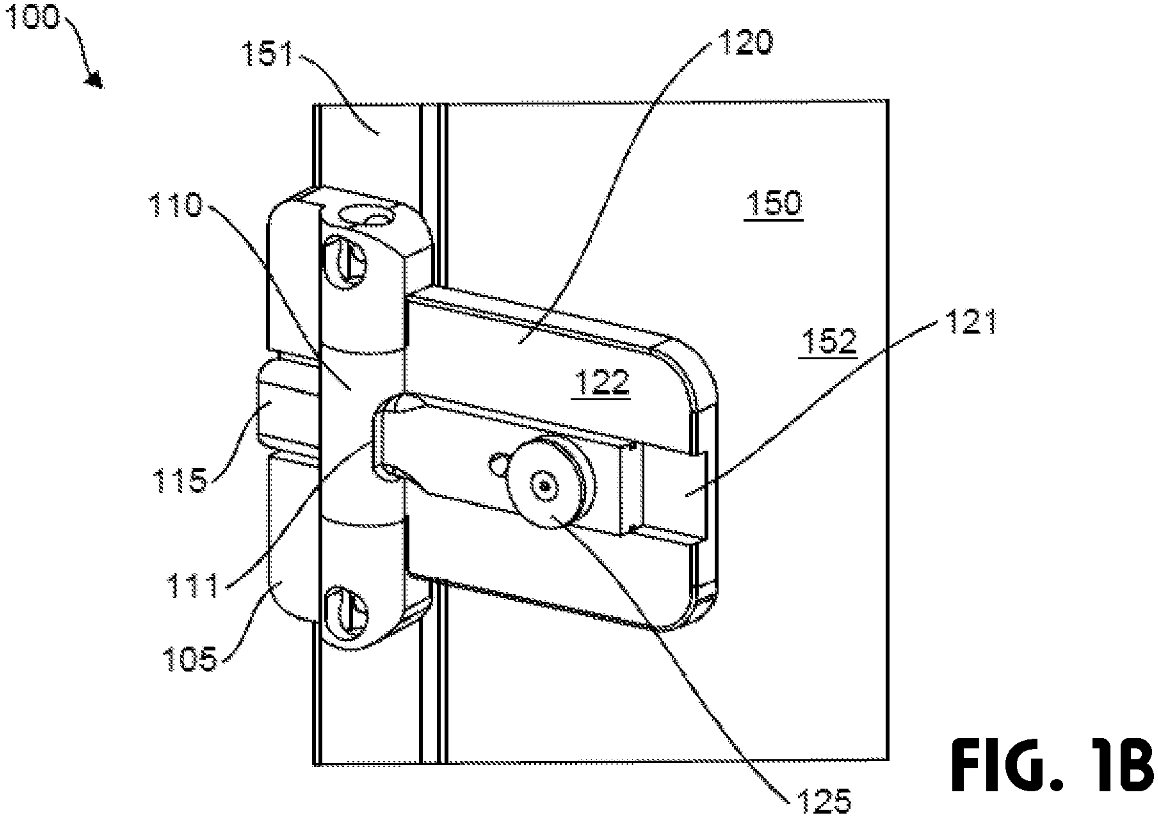
FIG. 1B is a conceptual diagram of the exemplary embodiment of a door security device of FIG. 1A in a locked state.

FIG. 1B is a conceptual diagram of the exemplary embodiment of the door security device of FIG. 1A in a locked state. When the slide bolt 115 is in the unlocked position (see FIG. 1A), the security device 100 and the door 150 can be opened. When the door is opened, the barrel/pin 110 rotates between the barrels of the barrel component 105 as the door swings open and closed, just like a hinge would operate. When the slide bolt 115 is moved to the locked position (see FIG. 1B) a portion of the slide bolt 115 is passed through an aperture 111 of the barrel/pin 110 and extends out the other side. The underside of the slide bolt 115 rests against a surface 160 in a receiver element of the barrel component 105 that aligns with channel 121. In this state, the door 150 is prevented from opening because a portion of the slide bolt 115 is extended over the surface of the leaf plate 120 in the channel 121, and another portion of the slide bolt 115 extends over the surface 160 of the barrel component 105. When an attempt is made to open the door 150, the portion of the slide bolt 115 that is extended over the surface 160 of the barrel component prevents the pin 110 from rotating, thus preventing the door from opening.

It should be appreciated that tremendous pressure may exist at the interface of the slide bolt 115 and the barrel component 105. As such, the securing device should be constructed of a rugged material that can withstand such forces or pressure. In addition, the length of the slide bolt can be adjusted to help distribute the force across a larger surface area. For instance, the surface 160 of the barrel component 105 may be several inches long and the slide bolt may extend from the jamb 151 to several inches past over the door 150, or even to or past a halfway point of the door 150. In addition, the thickness of the slide bolt can be increased to provide further strength as well as the thickness and material of the barrel/pin 110.

Figure 2:
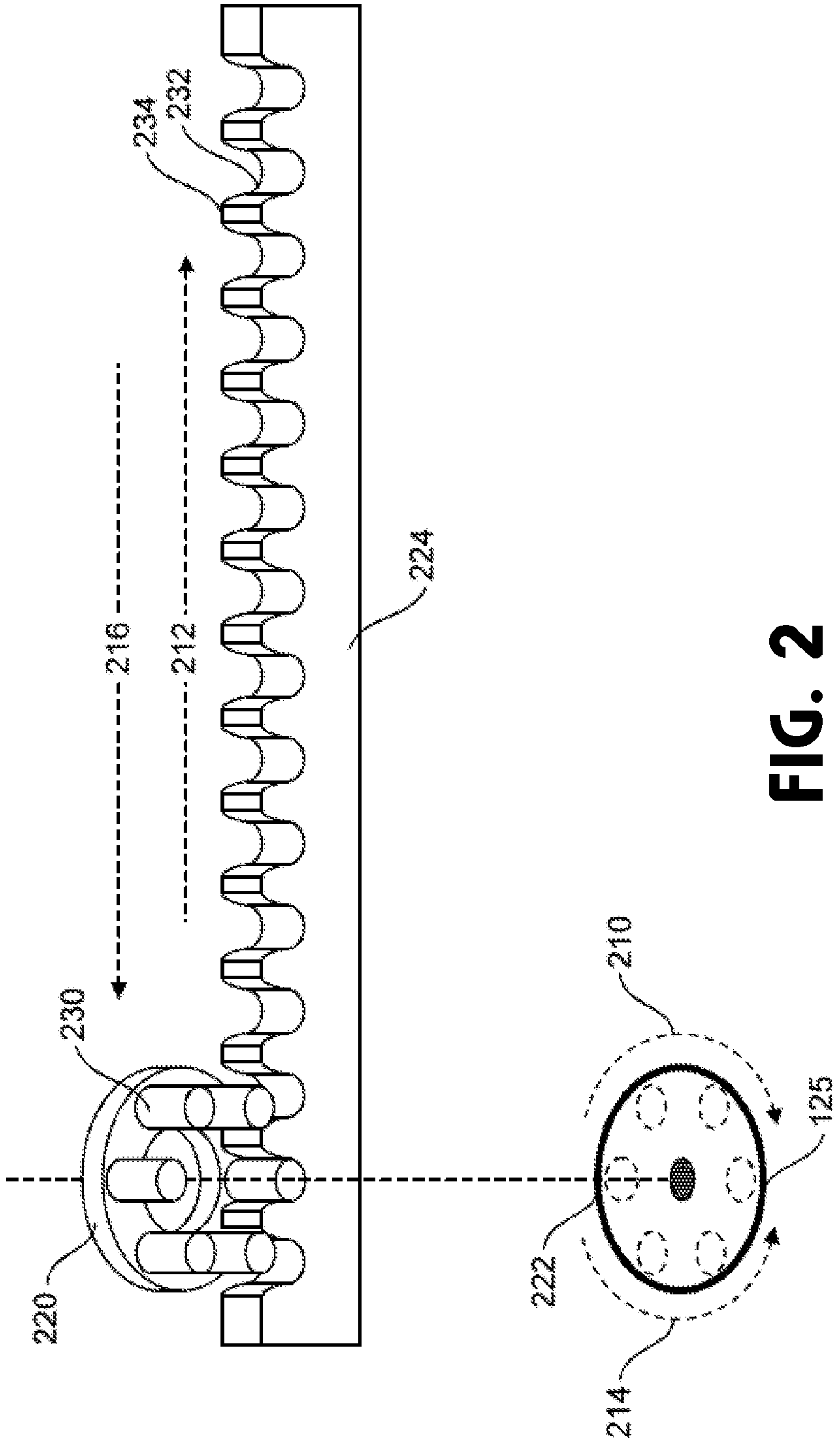
FIG. 2 is a conceptual diagram of a rack and pinion style drive that can be used for extending or retracting the exemplary embodiment of the security door-hinge device between the unlocked state of FIG. 1A and the locked state of FIG. 1B.

FIG. 2 is a conceptual diagram of a rack and pinion style drive that can be used for extending or retracting the exemplary embodiment of the security door-hinge device FIG. 1A. Actuation of the roller pinion actuator 125 operates to extend or retract the slide bolt 115 relative to an aperture 111 of the pin component 110. The roller pinion actuator 125 is illustrated as including a round gear 220 with a front knob 222 being accessible to a user. The round gear 220 engages with a linear gear (the rack) 224. The front knob 222 may include grooves around the outer side edge to help a user grip the actuator when actuating the roller pinion actuator 125. The round gear 220 includes a plurality of cogs 230 that fit inside the grooves 232 between the cogs 234 of the rack 224. In operation, a user may grip the front knob 222 of the roller pinion actuator 125 and turn it in a clockwise direction 210. Rotating the front knob 222 in the clockwise direction 210 causes the rack 224 to move in direction 216 as the cogs of the round gear 220 engage with the cogs 234 of the rack 224. With the rack 224 being physically connected or integral to the sliding latch 115, this forces the sliding latch 115 to move in the same direction, which as shown in the orientation of the door security device 100 changing from the state in FIG. 1A to the state in FIG. 1B by causing the sliding latch 115 to traverse through the aperture 111 of the pin component 110 and thus, secure the door in a locked position by preventing the barrel/pin 110 from rotating relative to the barrel 105.

Rotating the front knob 222 in the counterclockwise direction 214 causes the rack 224 to move in direction 212 as the cogs of the round gear 220 engage with the cogs 234 of the rack 224. This forces the sliding latch 115 to move in the same direction, which as shown in the orientation of the door security device 100 changing from the state in FIG. 1B to the state in FIG. 1A by causing the sliding latch 115 to traverse out of the aperture 111 of the pin component 110 and thus, return the door to the unlocked position and allowing the barrel/pin 110 to rotate relative to the barrel 105.

With the slide bolt 115 in a retracted state (such as in FIG. 1A), the door 150 may be freely opened as the leaf plate 120 is allowed to rotate with the barrel/pin component 110. By contrast, with the slide bolt 115 in an extended state (such as in FIG. 1), the slide bolt 115 extends through aperture 111 such that rotation of the barrel/pin 110 is prevented. Advantageously, with rotation of the pin component 110 prevented by the extended slide bolt 115, the leaf plate 120 that is coupled or integral to the surface 152 of the door 150 and the inability of the barrel/pin 110 to rotate operate to prevent the door 150 from being opened.

While FIG. 2 and other figures throughout illustrated the actuator 125 as being a wheel or disc that can be turned, it should be appreciated that other mechanisms may be utilized. For instance, a captain's wheel configuration, such as can be found on some safes may be used. Further, a latch can be used and swinging the latch from a closed to an open position may quickly cause the rack and pinion to traverse from an unlocked to a locked state.

Figure 3A:
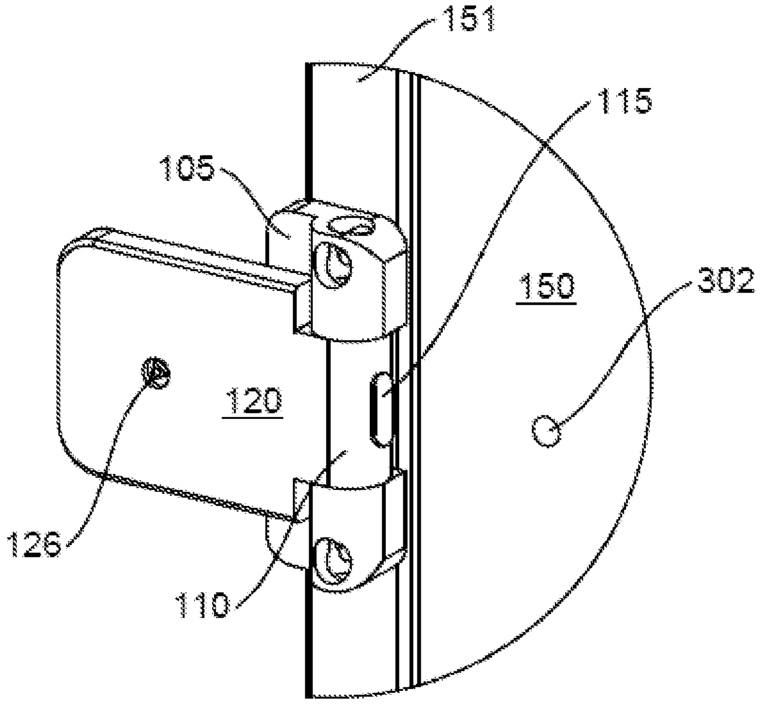
FIG. 3A is a conceptual diagram of the exemplary embodiment of the security door-hinge device of FIG. 1A, shown mounted to a doorjamb, but not yet mounted to a door, and residing in an unlocked state.

FIG. 3A is a conceptual diagram of the exemplary embodiment of the security door-hinge device of FIG. 1A, shown mounted to a door jamb, but not yet mounted to a door, and residing in an unlocked state. This diagram illustrates the barrel component 105 being mounted or secured to the jamb 151 but the leaf plate 120 is not yet secured to the door 150. In this illustration, an aperture 302 through the door 150 can be seen. Adding to that which has already been described relative to FIGS. 1A-1B, it can be seen in the FIG. 3A illustration that the rack and pinion actuator is accessible or can be operated through a port 126 on the door-side surface of the leaf plate 120. In this way, the rack and pinion may be accessed and actuated to retract the slide bolt 115 by engaging the rack and pinion through the aperture 302 positioned in the door 150. It is envisioned that the rack and pinion may be engaged through hole 302 using a specialized key or, in some embodiments, by an electronic code-actuated actuator (such as may be used on residential gun safes or the like) mounted on the exterior of the door and over the hole 302, as would be understood by one of ordinary skill in the art.

Figure 3B:
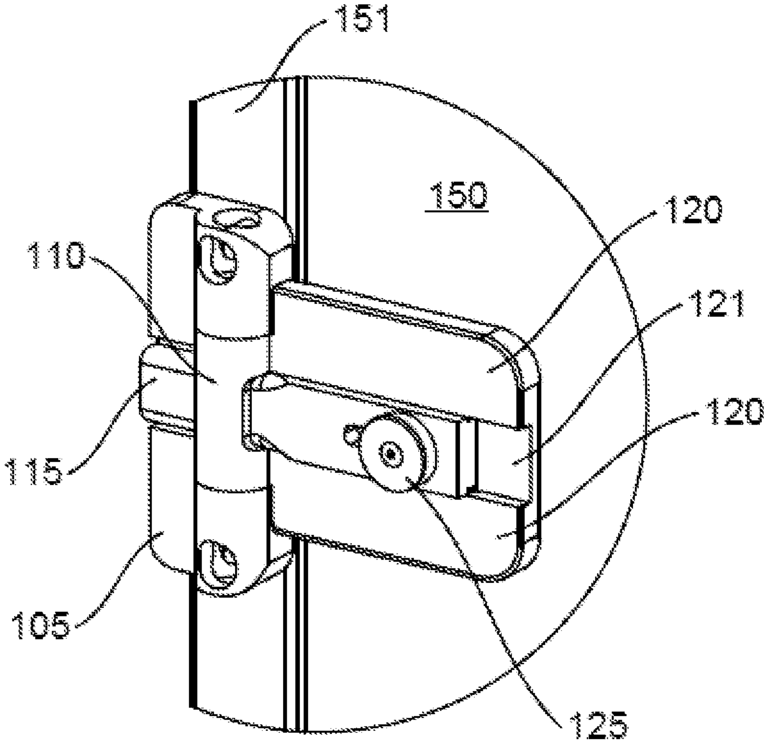
FIG. 3B is a conceptual diagram of the exemplary embodiment of the security door-hinge device of FIG. 1A, shown mounted to a doorjamb and to a closed door, and residing in a locked state.

FIG. 3B is a conceptual diagram of the exemplary embodiment of the security door-hinge device of FIG. 1A, shown mounted to a doorjamb and to a closed door, and residing in a locked state. In this illustration, the leaf plate 120 is shown as being extended and coupled to the door 150. In this configuration, the rack and pinion actuator 125 can be utilized to move the slide bolt 115 between the locked and unlocked position. Likewise, a special key, tool, fob or other mechanism may be utilized on the exterior of the door 150, through aperture 302 and port 126 to also move the slide bolt 115 between the locked and unlocked position.

It should be appreciated that the rack and pinion embodiment for the slide bolt 115 actuator is just an exemplary solution and other solutions may also be employed in various embodiments of the present invention. For instance, a spring lock mechanism may be used. In this embodiment a spring is used to bias the slide bolt 115 into an unlocked position. To lock the door, the slide bolt 115 can be manually slid to the locked position and a spring loaded stop may then trigger in the channel 121 to prevent the slide bolt 115 from springing back to the unlocked position. In such an embodiment, the port 126 may then be used to access the spring loaded stop such that it is moved or retracted out of the channel 121 path, thus allowing the spring bias of the slide bolt 115 to force the slide bolt 115 back into an unlocked position. In yet another embodiment, the actuator 125 may be a lock pin and the slide bolt 115 may be spring biased into the unlocked position. When a user slides the slide bolt to the locked position, the lock pin actuator 125 would be aligned with the port and thus, the user can press the lock pin actuator 125 such that a lock pin extends through the port 126 and thus prevents the spring bias of the slide bolt 115 from forcing the slide bolt back to the unlocked position. A user may then retract the lock pin actuator 125 to unlock the door or, a tool can be utilized from the exterior to do the same through the aperture 302.

Figure 4A:
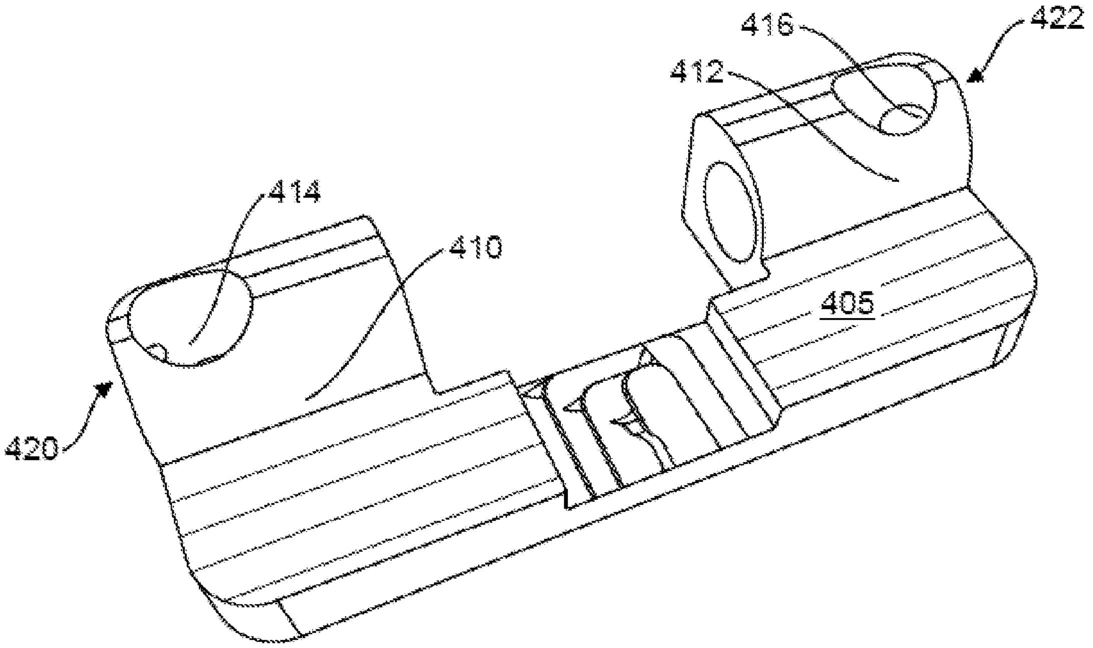
FIG. 4A is a first perspective view of the jamb mount portion, receiver or barrel component of the exemplary embodiment of the security door device of FIG. 1A and FIG. 1B.
Figure 4B:
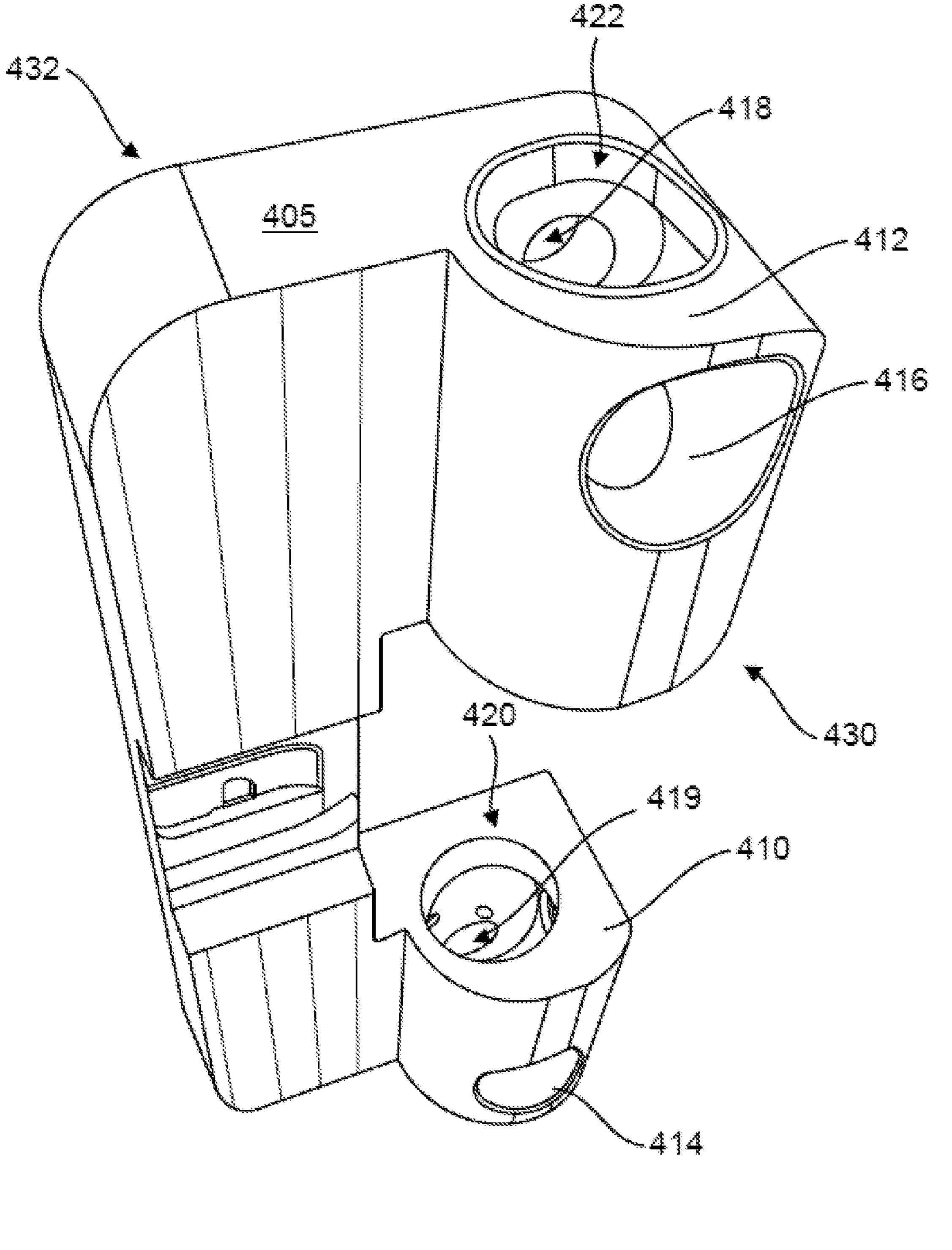
FIG. 4B is a second perspective view of the jamb mount portion of the exemplary embodiment of the security door device of FIG. 1A and FIG. 1B.

FIG. 4A is a first perspective view of the jamb mount portion or barrel component of the exemplary embodiment of the security door device FIG. 1A. FIG. 4B is a second perspective view of the jamb mount portion of the exemplary embodiment of the security door device FIG. 1A. The barrel component 405 could be utilized in the exemplary embodiment illustrated in FIG. 1A and FIG. 1B. The barrel component is illustrated as including two cylindrical-type barrel shapes. Barrel 410 is located on the lower side of the barrel component 405 and barrel 412 is located on the upper side of the barrel component 405. Both the lower barrel 410 and the upper barrel 412 include a hollowed-out center 420 and 422 respectively. The hollowed-out center 422 of the upper barrel 412 passes completely through the upper barrel 412. The hollowed-out center 420 of the lower barrel 410 may pass all the way through the lower barrel 410 in some embodiments and in other embodiments the lower barrel 410 may define a bottom such that the hollowed out center 420 only passes through the majority of the lower barrel 410.

The lower barrel 410 and the upper barrel 412 include mounting apertures 414 and 416 respectively. As best seen in FIG. 4B and with respect to the upper barrel 412, the mounting aperture 416 extends through the entire barrel and thus the aperture 416 is visible on the front face 430 of the barrel component 405 and then aperture 418 is shown as passing through the mounting side face 432 of the barrel component 405. The apertures 416 and 418 provide a path through the upper barrel 412 from the front face 430 to the mounting side face 432. A similar structure is provided for lower barrel 410 with aperture 414 and 419.

To mount the barrel component 405 to a doorjamb, the barrel component 405 is held in place and a fastening device can be passed through aperture 416 and aperture 418 and then attached onto or into and through the doorjamb. It will be appreciated that apertures 418 and 419 is smaller in diameter than apertures 416 and 414 thus allowing the head of the connector, such as a screw, bolt, nail, etc., to pass through apertures 416 and 414 but not through apertures 418 and 419, thus holding the barrel component 405 against the jamb. It should also be appreciated that the apertures 418 and 419 may be tapered or indented such that the head of the connecting device can be set below the interior surface of the hollowed-out centers 420 and 422.

Figure 5:
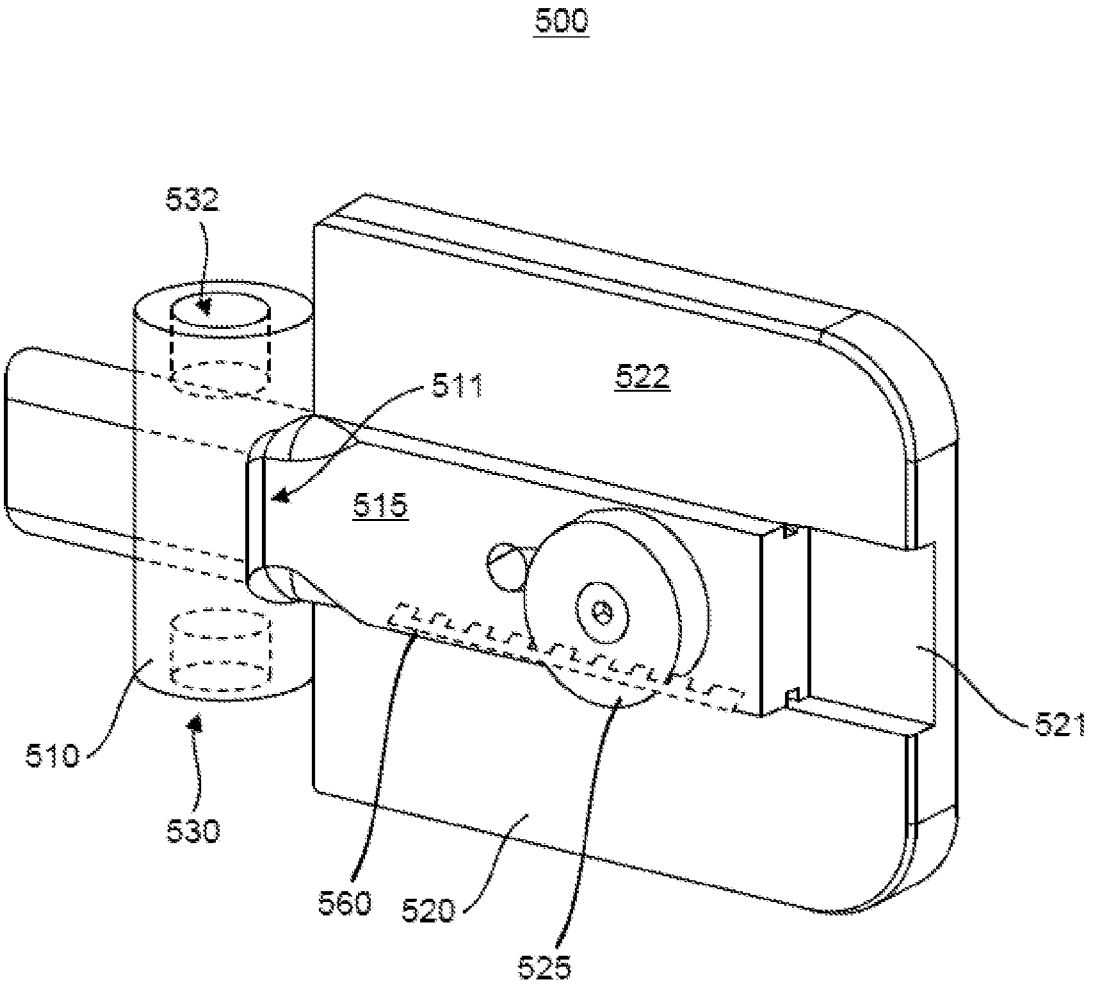
FIG. 5 is a perspective view of the door mount portion or the latch assembly and pin component of the exemplary embodiment of the security door device of FIG. 1A and FIG. 1B.

FIG. 5 is a perspective view of the door mount portion or the latch assembly and barrel/pin component of the exemplary embodiment of the security door device FIG. 1A. The door mount portion 500 includes the pin component 510 and the latch assembly 522. The latch assembly 522 includes a leaf plate 520 that extends from the pin component 510 and is configured to be mounted or attached to the interior surface of a door. The latch assembly 522 also includes the slide bolt 515, which is moveably engaged within a channel 521 in the leaf plate 520. An actuator 525 is utilized to move the slide bolt 515 from an unlocked position to a locked position by using a structure, such as a rack and pinion. A rack 560 is illustrated as being internal to the slide bolt 515. The pinion 525 engages with the rack 560 such that when the pinion 525 is rotated, the slide bolt 515 moves between an engaged and disengaged position.

The pin component 510 is illustrated as including an aperture 511 to allow the slide bolt 515 to pass through it and thus lock the pin component 510 and the barrel component (405 in FIG. 4A and FIG. 4B) into position to secure a door.

The pin component 510 mounts between the upper barrel 412 and lower barrel 410 of the barrel component 405 (FIG. 4A and FIG. 4B). The pen component 510 can be held in position using a variety of techniques. In one embodiment, two receptors 530 and 532 are defined by the pin component 510. Receptors 530 and 532 may receive a pin (not illustrated) that extends into the receptors and then out into the hollowed-out centers 420 and 422 of barrels 410 and 412 respectively of the barrel component 405. In one embodiment, the pins may be threaded and the receptors 530 and 532 may be threaded to receive the threaded pins. In another embodiment, the connecting device that is passed through apertures 414 and 416 may include an extended head that extends across the hollowed-out centers 420 and 422. In such a configuration, the pins can be inserted into the receptors 530 and 532 and then the connecting devices can be used to hold the pins in place. In yet other embodiments, the pins include a spring mechanism and may be fixedly attached within the receptors 530 and 532. To insert the pin component between barrels 410 and 412, the pins can be depressed allowing the pin component 510 to slide into position, and then the pins within the receptors 530 and 532 can pop into place, securing the pin component 405 and the latch subassembly 522 together.

Figure 6A:
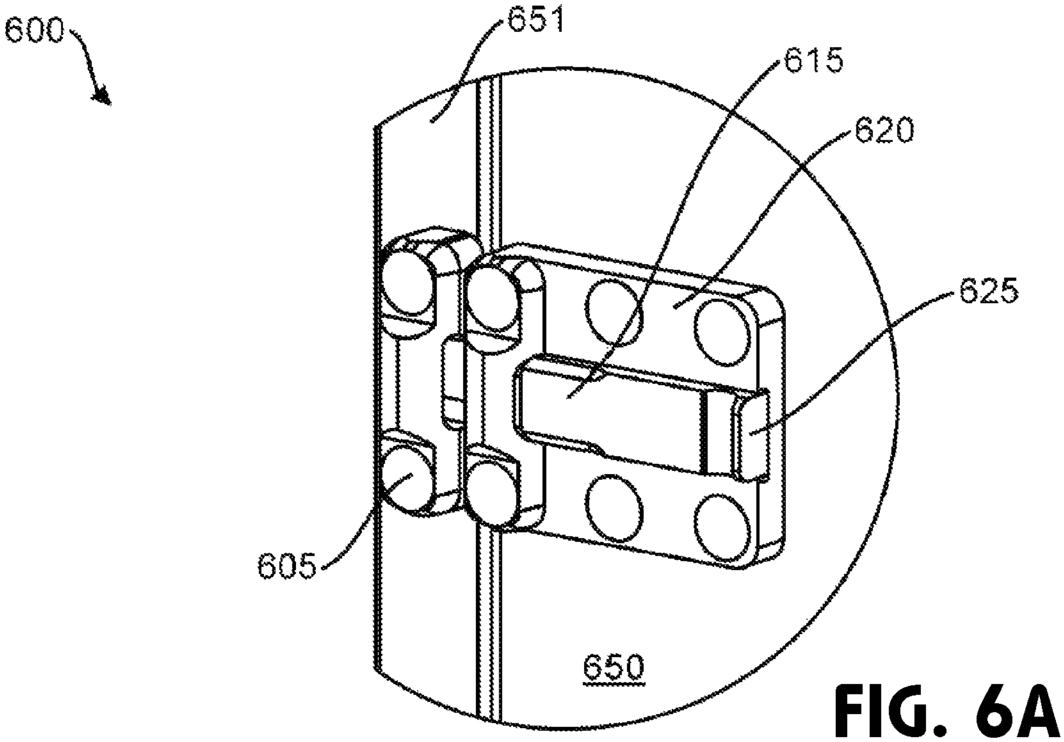
FIG. 6A is a conceptual diagram of an exemplary embodiment of a door security device that can be attached to the door on the knob-side.
Figure 6B:
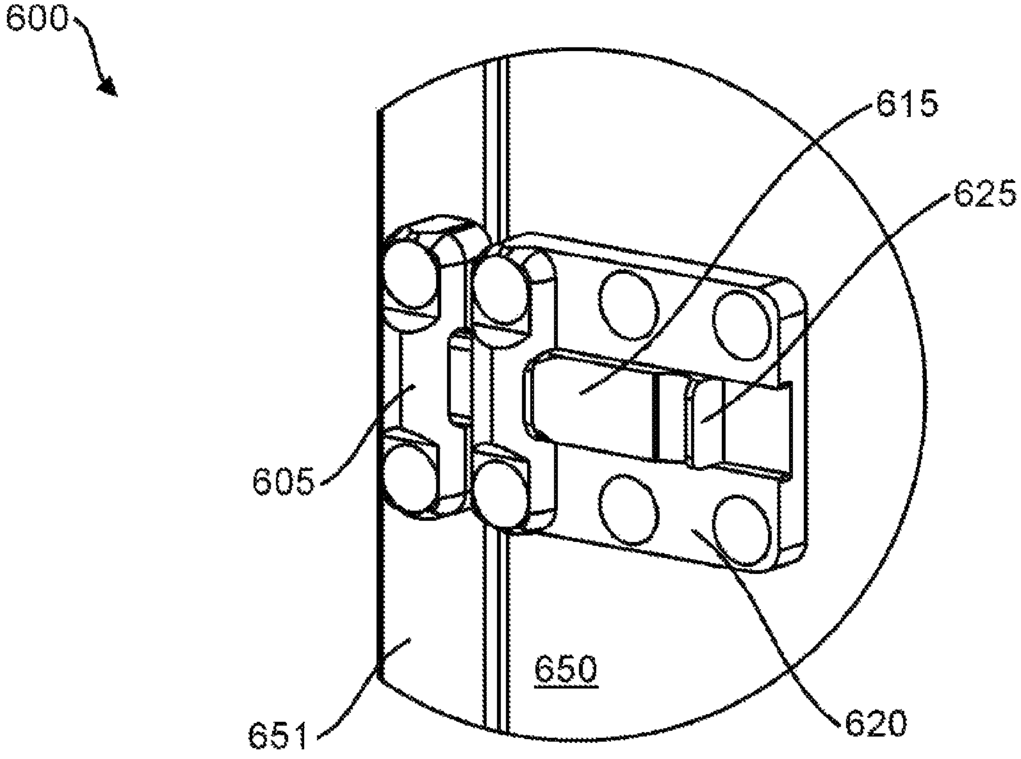
FIG. 6B is a conceptual diagram of the exemplary embodiment of the door security device of FIG. 6A as viewed from the interior side and being in a locked state.

FIG. 6A is a conceptual diagram of an exemplary embodiment of a door security device that can be attached to the door on the knob-side. The embodiment illustrated in FIG. 6A is viewed from the interior side of the door and the door security device is in an unlocked state. FIG. 6B is a conceptual diagram of the exemplary embodiment of the door security device of FIG. 6A as viewed from the interior side and being in a locked state.

Similar to the embodiment illustrated and described above relative to FIG. 1A and FIG. 1, the knob-side embodiment comprises a receiver, such as a jamb plate 605 mounted to/through a doorjamb 651. A complementary leaf plate 620 is mounted to/through the door 650. With the slide bolt 615 fully retracted via actuation of handle 625 away from jamb 651, the knob-side door security device 600 is in an unlocked state such that door 650 may be opened and closed under normal operation. Looking at FIG. 6B, the handle 625 has been moved from the unlocked position into the locked position by sliding the slide bolt 615 into a recess in the jamb plate 605, thus preventing the door 650 from being opened.

Figure 7A:
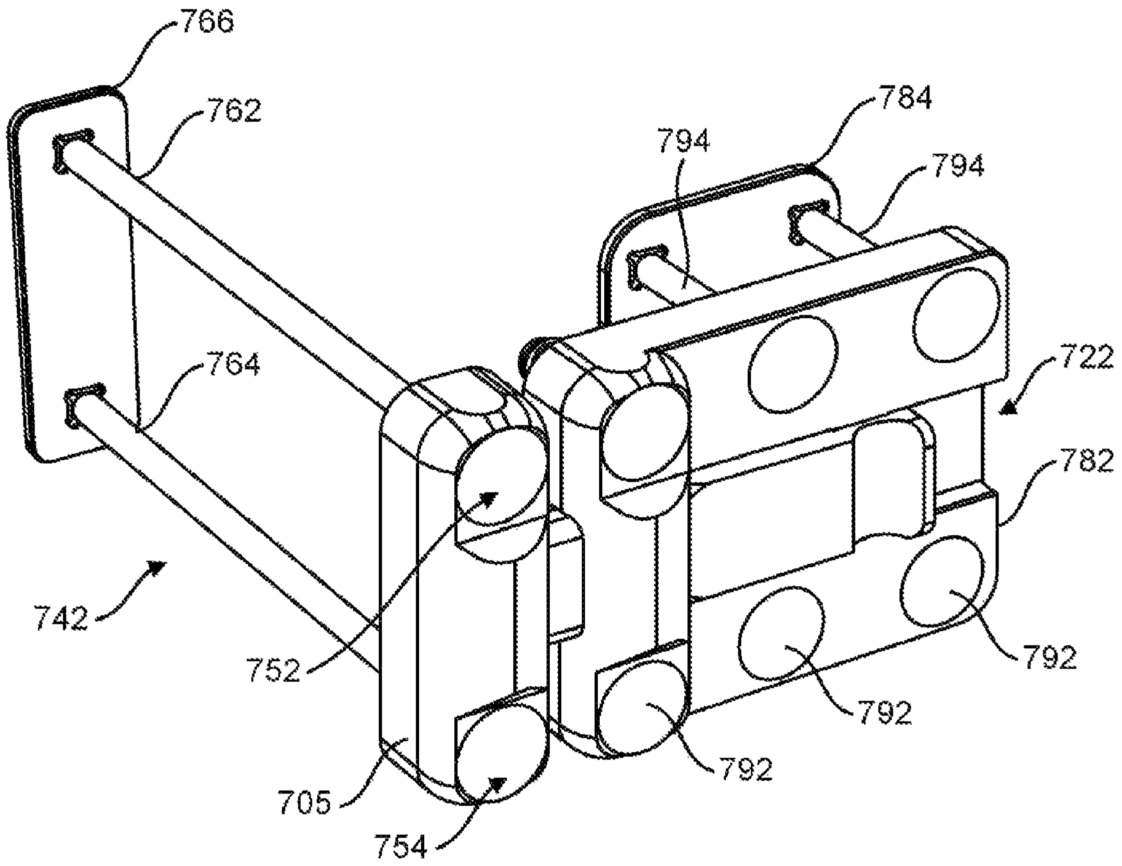
FIG. 7A is a first perspective conceptual diagram of an exemplary embodiment of the knob-side door security device illustrated in FIG. 6A and FIG. 6B and illustrated as being unmounted or uninstalled on a door and jamb.
Figure 7B:
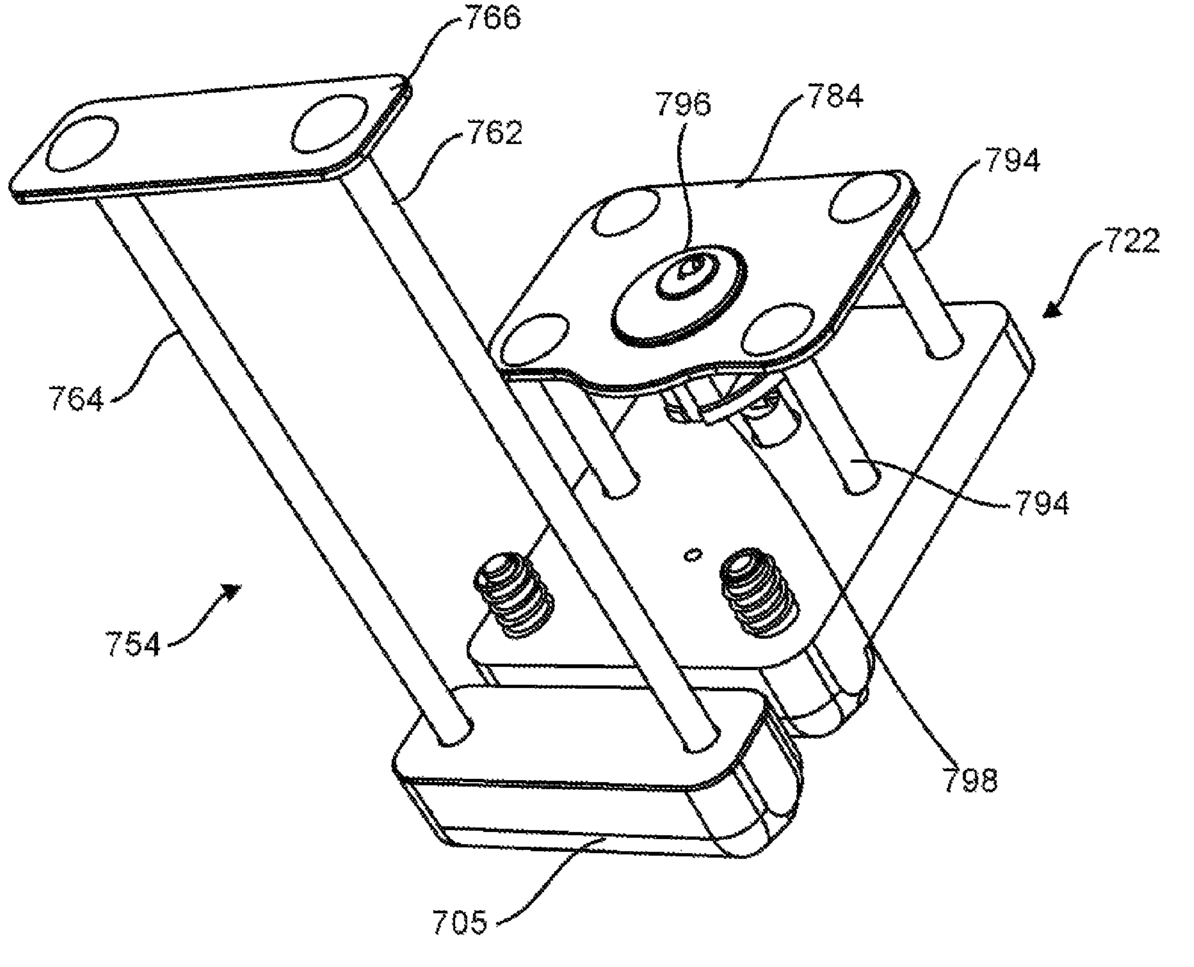
FIG. 7B is a second perspective conceptual diagram of the exemplary embodiment of the knob-side door security device illustrated in FIG. 6A and FIG. 6B and illustrated as being unmounted or uninstalled.

FIG. 7A is a first perspective conceptual diagram of an exemplary embodiment of the knob-side door security device illustrated in FIG. 6A and FIG. 6B and illustrated as being unmounted or uninstalled on a door and jamb. FIG. 7B is a second perspective conceptual diagram of the exemplary embodiment of the knob-side door security device illustrated in FIG. 6A and FIG. 6B and illustrated as being unmounted or uninstalled. Looking at FIG. 7A, the embodiment includes the jamb assembly 742 and the latch assembly 722. The jamb assembly 742 includes a jamb plate 705 that may be mounted to the interior side of the door jamb. The jamb plate 705 can be mounted by using two screws at positions 752 and 754 to mount the jamb plate 705 to a doorjamb. Alternatively, mounting rods 762 and 764, secured to mounting plate 766 maybe utilized by drilling pilot holes through the doorjamb from the interior side to the exterior side. The mounting rods 762 and 764, already mounted to the mounting plate 766 can then be slid through the pilot holds and the ends of the rods 762 and 764 align with the positions 762 and 764 of the jamb plate 705. The ends of the rods 762 and 764 may be female threaded receivers and thus bolts can be screwed into the rods 762 and 764 to secure the jamb plate 705 to the doorjamb by tightening the bolts such that the mounting plate 766 is pressed against the exterior side of the doorjamb and the jamb plate 705 is pressed against the interior side of the doorjamb. Turning to FIG. 7B, it can be seen that the ends of the rods 762 and 764 extend through the mounting plate 766 but do not include any mechanism to unscrew the rods 762 and 764 from the exterior side of the door. In other embodiments, the rods 762 and 764 may simply be welded to the opposite side of the mounting plate 766 such that they are not even visible from the exterior side of the door.

Turning back to FIG. 7A, the latch assembly 722 includes the interior mounted portion 782 and the exterior mounting plate 784. Similar to the mounting techniques described for the jamb assembly 742, the latch assembly 722 can be mounted to the interior side of a door using screws at points 792 or, multiple rods 794 may be used to mount the interior mounted portion 782 to the exterior mounting plate 784 through pilot holes drilled in the door. In FIG. 7B, the exterior mounting plate 784 for the latch assembly 722 includes a port 796. Similar to the port 126 describe in FIG. 3A, this port can be accessed from the exterior side of the door and emergency personnel may have a special tool that operates to actuate the secure door device from the outside and move the secure door device from a locked to an unlocked state. As can also be seen in FIG. 7B, the port may provide access to an electrical and/or mechanical element 798 for controlling the ability to unlock the security device from the exterior of the door. The electrical and/or mechanical element 798 may provide key, tool, code, electrical signal, etc., access to controlling the actuator for locking and unlocking the security device.

Figure 8A:
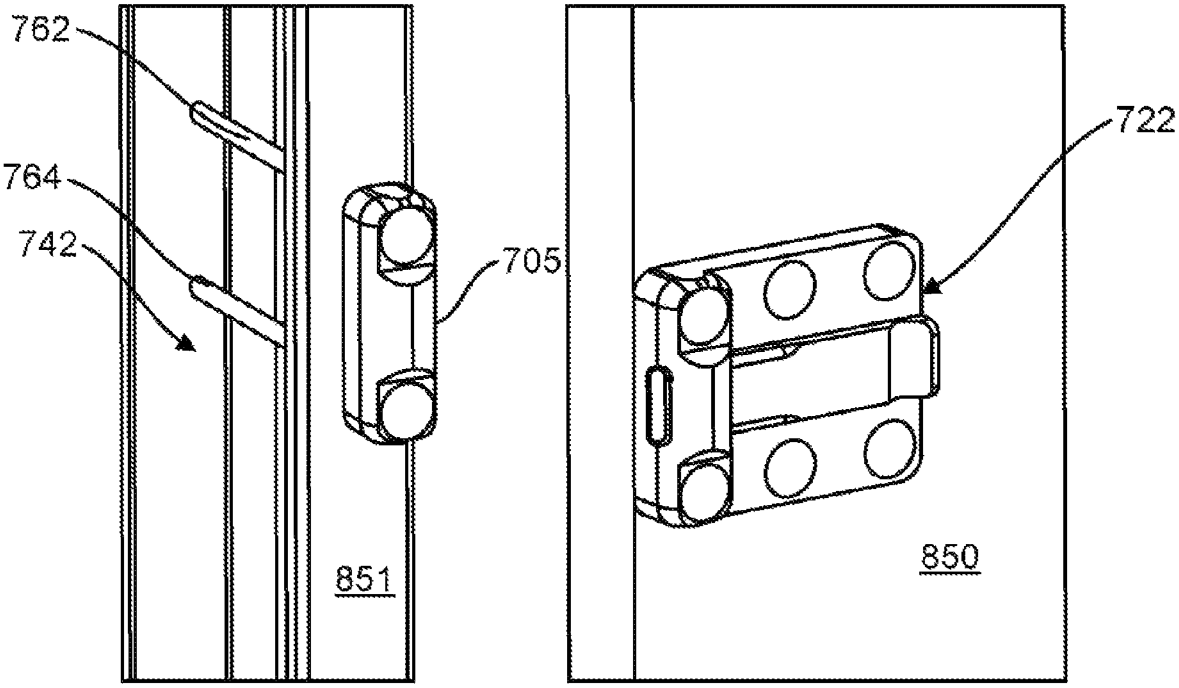
FIG. 8A is a conceptual diagram of the embodiment illustrated in FIG. 7A and FIG. 7B installed onto a door and doorjamb.
Figure 8B:
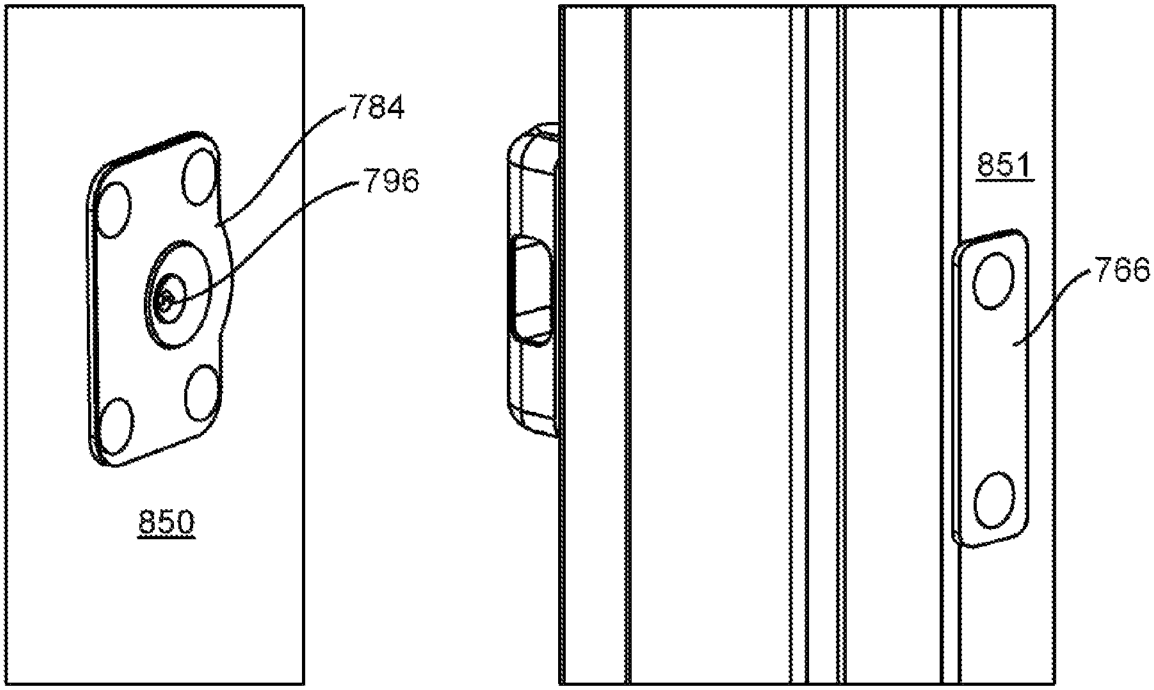
FIG. 8B illustrates the same conceptual diagram of FIG. 8A from the exterior side of the door view.

FIG. 8A is a conceptual diagram of the embodiment illustrated in FIG. 7A and FIG. 7B installed onto a door and doorjamb. The latch assembly 722 is illustrated as being on the inside surface of door 850 and the jamb plate 705 is mounted to the interior side of the door jamb 851. In the illustrated embodiment rods 762 and 764 are used to secure the jamb plate 705 to the jamb 851. FIG. 8B illustrates the same conceptual diagram of FIG. 8A from the exterior side of the door view.

Figure 9A:
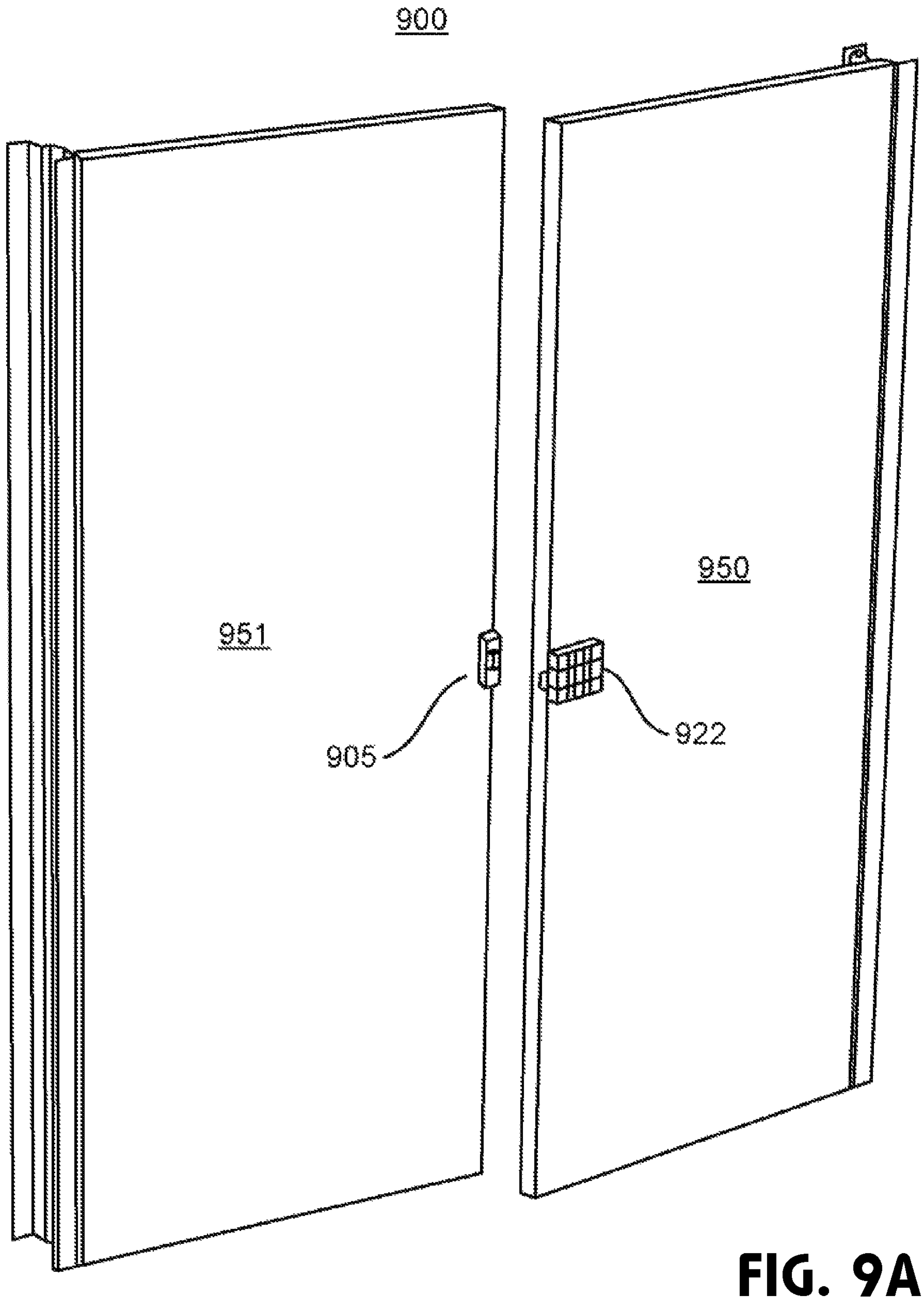
FIG. 9A is a conceptual diagram of an exemplary embodiment of the secure door device that is suitable for use on a non-mullion double door.
Figure 9B:
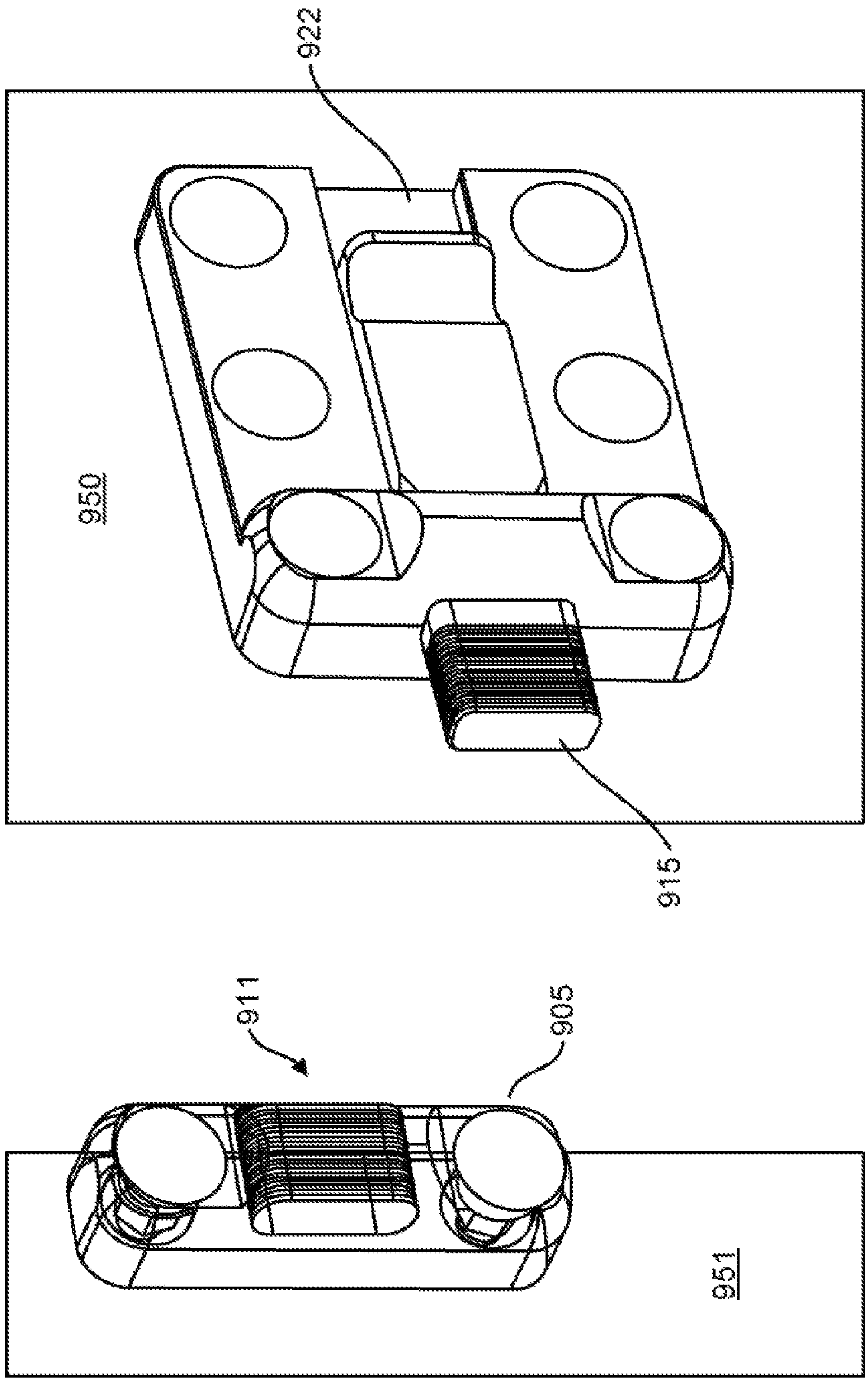
FIG. 9B is a conceptual diagram of an exemplary embodiment of the secure door device that is suitable for use on a non-mullion double door and illustrating the use of grooves in the receptor and sliding bolt.

FIG. 9A is a conceptual diagram of an exemplary embodiment of the secure door device that is suitable for use on a non-mullion double door. The exemplary embodiment 900 essentially includes the features and structures previously described relative to other embodiments. In the illustrated embodiment, a latching assembly 922 is illustrated as being mounted to one door 950, and a jamb assembly 905 is illustrated as being mounted to the other door 951. As those skilled in the art will appreciate, it can be problematic to latch double doors together when a mullion is not utilized to secure the doors shut. FIG. 9B is a conceptual diagram of an exemplary embodiment of the secure door device that is suitable for use on a non-mullion double door and illustrating the use of grooves in the receptor and sliding bolt. For instance, with a typical sliding bolt, the doors can be pushed open and the sliding bolt on one door simply slides out of the receiving receptacle on the other door. In addressing this problem in the art, the end of the sliding bolt 915 includes a plurality of grooves or threads and the receptor 911 also includes a plurality of grooves or threads. Notably, the exemplary embodiment 900 further thus includes a slide bolt 915 with a grooved or serrated surface. The grooves are applied to the end of the slide bolt 915 in a circumferential arrangement, as can be understood best by referring to FIG. 9B. Advantageously, the aperture or receptor 911 features complementary grooves circumferentially featured in its walls. The result is that when the slide bolt 915 is engaged into aperture 911, the respective grooves of the bolt 915 and aperture 911 engage or lock together when a separating force is applied to the non-mullion double doors 850, 851 (see FIG. 9C). With the grooves of aperture 911 and slide bolt 915 engaged, an increased separating force applied to the doors 950, 951 only promotes further engagement of the complementary grooves.

Figure 9C:
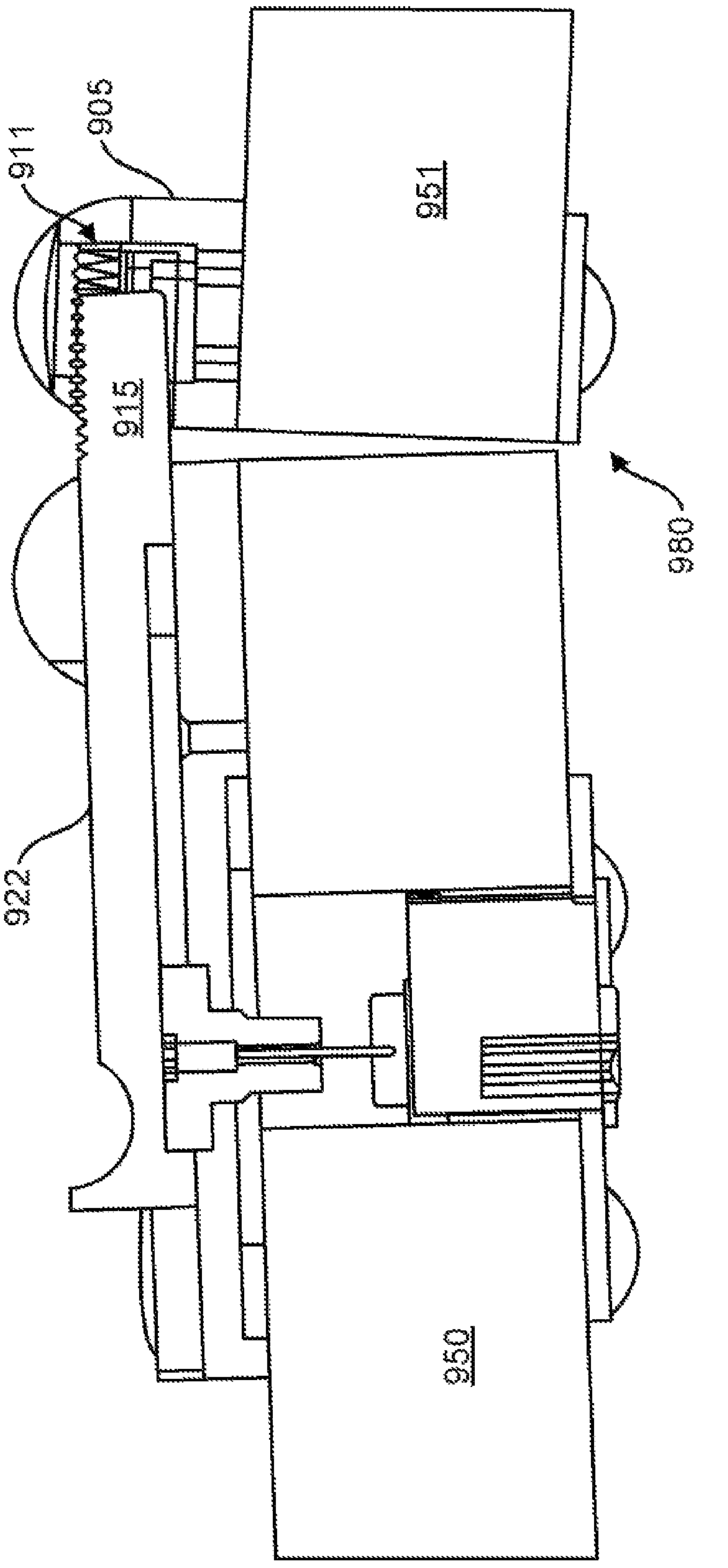
FIG. 9C is a conceptual diagram illustrating the operation of the grooves or threads in the sliding bolt 915 and the aperture 911.

In operation, when the door 950 is moved to a closed position, the sliding bolt 915 aligns with the aperture 911 of the jamb plate 905. Once the sliding bolt 915 is engaged or moved to the locked position, the groves of the sliding bolt 915 are inside the aperture 911. FIG. 9C is a conceptual diagram illustrating the operation of the grooves or threads in the sliding bolt 915 and the aperture 911. As can be best seen in FIG. 9C, once the sliding bolt 915 is set to the locked position, the grooves of the sliding bolt 915 are within the receptor 911. If pressure is applied to the double door in the direction of 980, the grooves on the sliding bolt 915 engage with the grooves on the interior surface of the receptor 911 and thus prevent the sliding bolt 915 from sliding out of the receptor 911.

In other embodiments, rather than grooves or serrations, the sliding bolt may include one or more hook shaped protrusions on the end and the receptor may include mating flanges. In normal operation, the sliding bolt and the hooks may slide into and out of the receptor, sliding past the mating flanges. However, if the door is pushed slightly open, causing the slide bolt to be at an angle (similar to what can be seen in FIG. 9C), then the hook(s) on the sliding bolt will not be able to slide past the flanges in the receptor, thus preventing the door from being opened.

Figure 10:
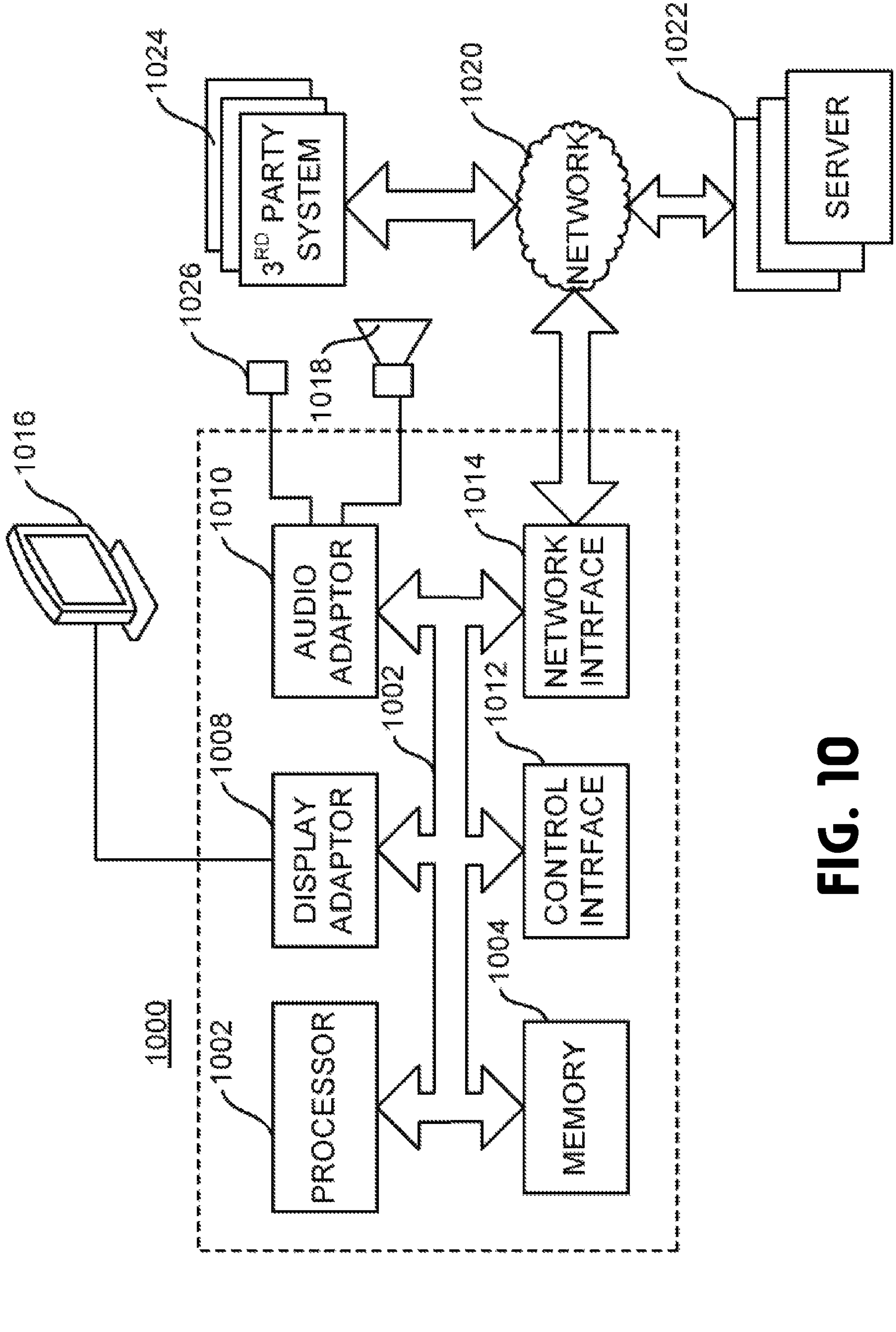
FIG. 10 is a functional block diagram of the components of an exemplary embodiment of system or sub-system operating as a controller or processor 1000 that could be used in various embodiments of the disclosure for controlling aspects or features of the various embodiments.

In some of the described embodiments and other embodiments, electronic circuitry may be required. For instance, if the actuation of the slide bolt between a locked state and unlocked state is automated, a processor and various electric components, such as a step motor, etc., may be used to implement the automation. Thus, in a school setting, a system controller may be actuated to cause one or multiple doors to transition to the locked state. Sensors may also be deployed to verify that the doors are closed before actuating the transition to the locked state. Likewise, if an electronic control on the external side of the door is utilized to unlock the door, a processor and other components may also be required. FIG. 10 is a functional block diagram of the components of an exemplary embodiment of system or sub-system operating as a controller or processor 1000 that could be used in various embodiments of the disclosure for controlling aspects or features of the various embodiments. It will be appreciated that not all of the components illustrated in FIG. 10 are required in all embodiments of the activity monitor but, each of the components are presented and described in conjunction with FIG. 10 to provide a complete and overall understanding of the components. The controller can include a general computing platform 1000 illustrated as including a processor/memory device 1002/1004 that may be integrated with each other or, communicatively connected over a bus or similar interface 1006. The processor 1002 can be a variety of processor types including microprocessors, micro-controllers, programmable arrays, custom IC's etc. and may also include single or multiple processors with or without accelerators or the like. The memory element of 1004 may include a variety of structures, including but not limited to RAM, ROM, magnetic media, optical media, bubble memory, FLASH memory, EPROM, EEPROM, etc. The processor 1002, or other components in the controller may also provide components such as a real-time clock, analog to digital convertors, digital to analog convertors, etc. The processor 1002 also interfaces to a variety of elements including a control interface 1012, a display adapter 1008, an audio adapter 1010, and network/device interface 1014. The control interface 1012 provides an interface to external controls, such as sensors, actuators, drawing heads, nozzles, cartridges, pressure actuators, leading mechanism, drums, step motors, a keyboard, a mouse, a pin pad, an audio activated device, as well as a variety of the many other available input and output devices or, another computer or processing device or the like. The display adapter 1008 can be used to drive a variety of alert elements 1016, such as display devices including an LED display, LCD display, one or more LEDs or other display devices. The audio adapter 1010 interfaces to and drives another alert element 1018, such as a speaker or speaker system, buzzer, bell, etc. The network/interface 1014 may interface to a network 1020 which may be any type of network including, but not limited to the Internet, a global network, a wide area network, a local area network, a wired network, a wireless network or any other network type including hybrids. Through the network 1020, or even directly, the controller 1000 can interface to other devices or computing platforms such as one or more servers 1022 and/or third-party systems 1024. A battery or power source provides power for the controller 1000.

As previously described, the various embodiments of the secure door device operate to provide security to the parties that are on the interior side of the door or other opening. However, as presented above, there can be circumstances where the secured parties need to be accessed by rescue personnel, parents, guardians or other care takers. The security of the parties on the interior is important but if the parties cannot be accessed when necessary, the security may end up being to their detriment. As such, the various embodiments of the secure door device provide an emergency access procedure or mechanism that enables rescue personnel, parents, guardians or other care takers to unlock the door and gain access to the parties. As those skilled in the art can appreciate, a physical key or electronic key are generally accepted techniques to restrict access to the interior of a building or room except to those that have the key or code to enter. However, it should be appreciated that if every door that utilized embodiments of the secure door device described herein, rescue or emergency personnel would have to carry boxes of keys around with them and ensure a method to index those keys for rapid access. Initial embodiments of the present invention may simply utilize a specialized tool that is only available to essential personnel. As such, the same tool may be utilized for each of the doors within a facility. Further, the tool may be stored in a location that is only accessible to emergency personnel when they arrive at the location. Thus, the emergency personnel can access the safety box, such a safe, to obtain the tool and then proceed to unlock any doors that need to be opened.

In other embodiments, an electronic key may be utilized. Using this technique, the secure door locks can be updated with new codes and emergency personnel can also be updated. To access a door, the digital key can simply be held to the secure door device and if the secure door device is in the locked state, it will transition to the open state.

Figure 11B:
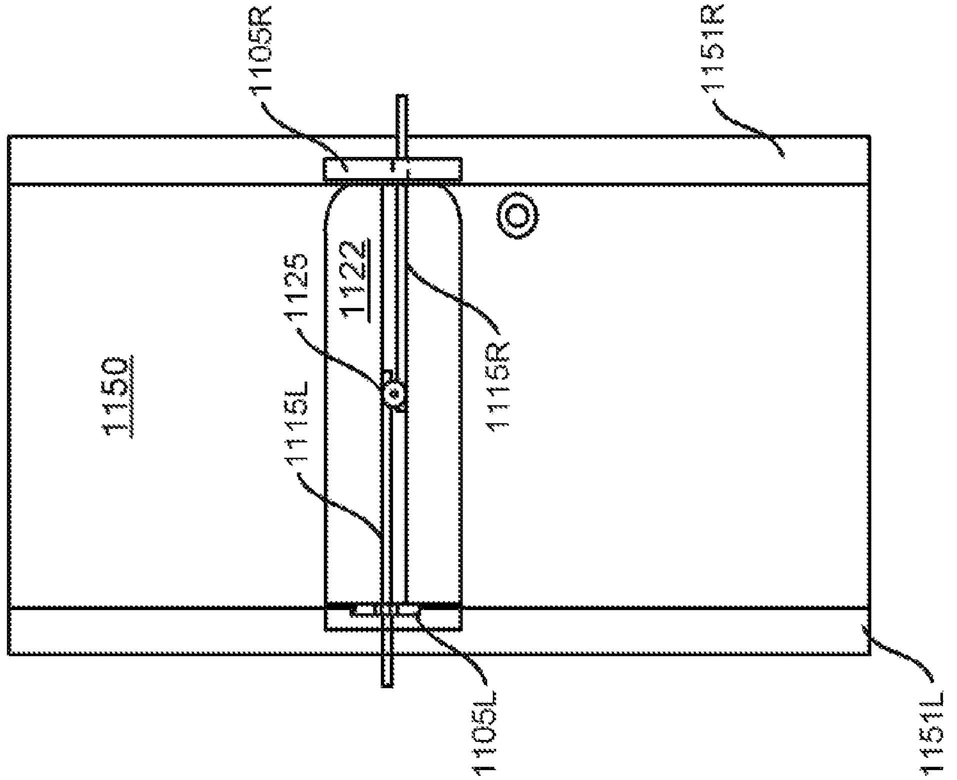
FIG. 11B is a conceptual diagram illustrating a security device that provides a double slide bolt action in a locked state.
Figure 11A:
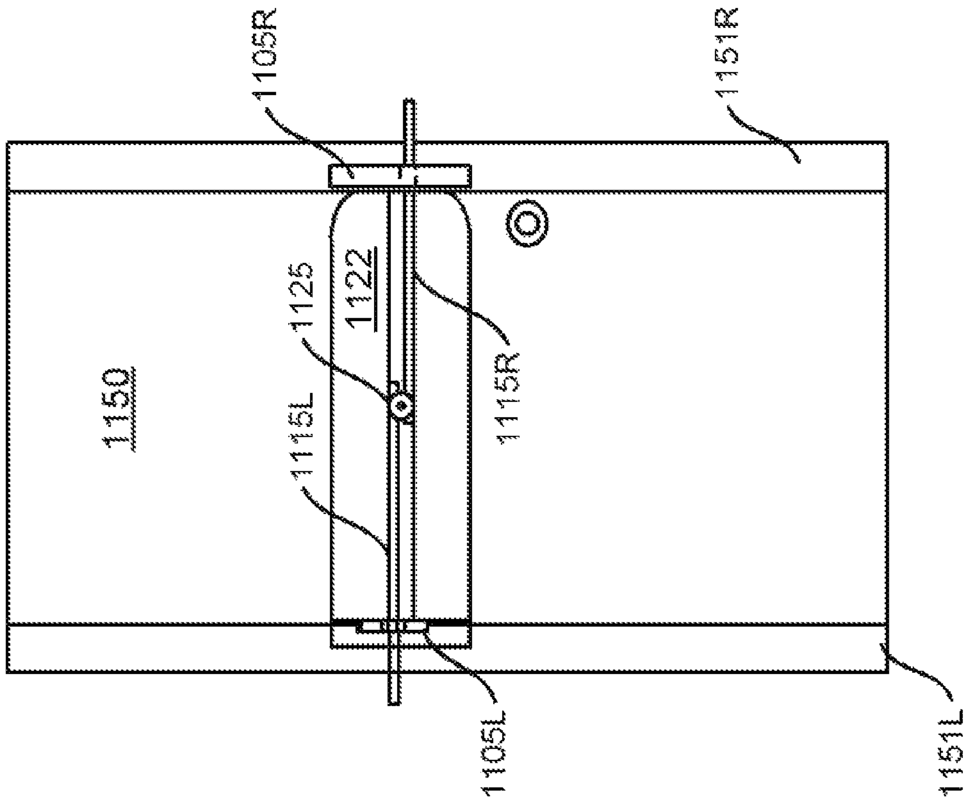
FIG. 11A is a conceptual diagram illustrating a security device that provides a double slide bolt action in an unlocked state.

FIG. 11A is a conceptual diagram illustrating a security device that provides a double slide bolt action in an unlocked state. FIG. 11B is a conceptual diagram illustrating a security device that provides a double slide bolt action in a locked state. In the illustrated embodiment, a door 1150 is illustrated as being installed between two doorjambs 1151L and 1151R. In this embodiment a double slide bolt is utilized such that the door 1150 can be secured on both the hinge side and the knob side. A receiver in the form of a barrel component 1105L is shown as being installed on the left-side jamb 1151L and a receiver 1105R is installed on the right-side jamb 1151R. The latch assembly 1122 in this embodiment extends across the entire face of the door 1150 and includes two slide bars 1115L and 1115R. Actuator 1125 is position on the latch assembly 1122 and is used to control the extension and retraction of both of the slide bars 1115L and 1115R. In operation, when the actuator 1125 is exercised, the slide bar 1115L is moved towards the left, through an aperture in the pin similar to FIG. 1A and FIG. 1B, and then is flush against the outer surface of the barrel component 1105L. At the same time, bar 1115R moves to the right and through the aperture in receiver 1105R similar to the embodiment illustrated in FIG. 8A and FIG. 8B. FIG. 11B shows the slide bars 1115L and 1115R expanded such that the door 1150 is in the locked state. As presented in the other embodiments, an aperture through the door 1150 can provide access to a port on the back side of the latch assembly 1125 to enable first responders, rescue personnel, family, school faculty, etc. to gain access to the area restricted by the looked door 1150.

In some embodiments, an interior and/or exterior indicator may be utilized to indicate if the secure door device is in the locked or unlocked position. For instance, an LED may be used and when the LED is green, it can indicate that the secure door device is unlocked. When the secure door device transitions to the locked state, the LED can change to the color red.

Privacy Panel.

The various embodiments of the present invent may include a privacy panel in addition to or in lieu of the other aspects and embodiments previously presented herein. The various features, aspects and elements of exemplary embodiments of the privacy panel are presented in this section.

Figure 12:
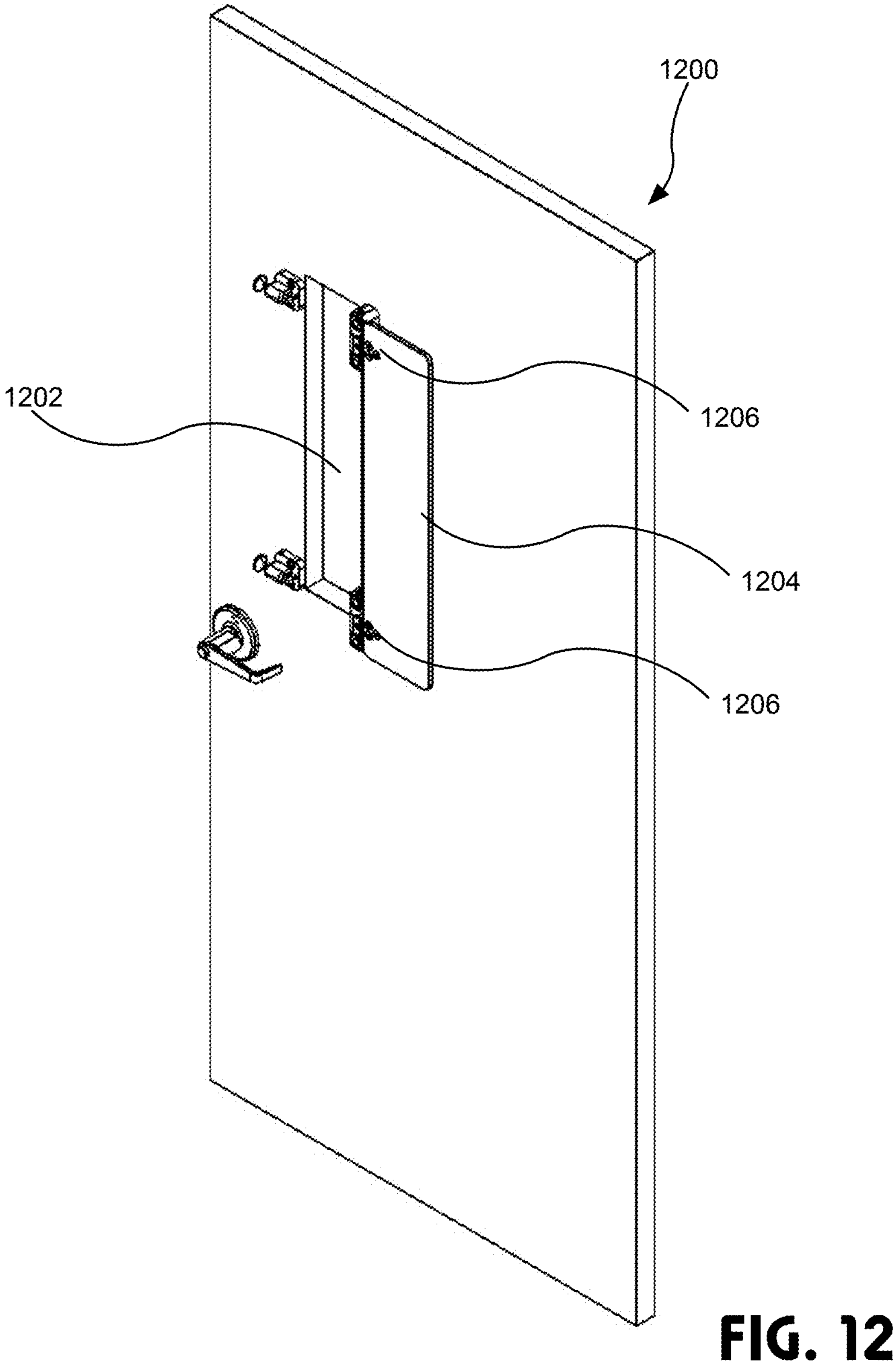
FIG. 12 illustrates an embodiment of the solution with the window covering plate in its default “fail-open” state such that it is juxtaposed to the door surface by the spring-loaded hinges and the door window is exposed.

FIG. 12 illustrates an embodiment of the privacy panel solution with a window covering plate in its default "fail-open" state such that it is juxtaposed to the door surface by the spring-loaded hinges and the door window is exposed. The door 1200 is illustrated as including a window or opening 1202. A privacy panel 1204 is illustrated as being hingedly attached to the inner or interior surface of the door 1200 adjacent to an edge of the window 1202. Although the window or opening 1202 is illustrated as being rectangular, it should be appreciated that the various embodiments may be configured to operate with windows or openings of any size or shape.

The privacy panel 1204 is illustrated as being attached to the door 1200 with hinges 1206. It should be appreciated that while the illustrated embodiment includes two hinges, any number of hinges may be utilized from one to several hinges.

Figure 13:
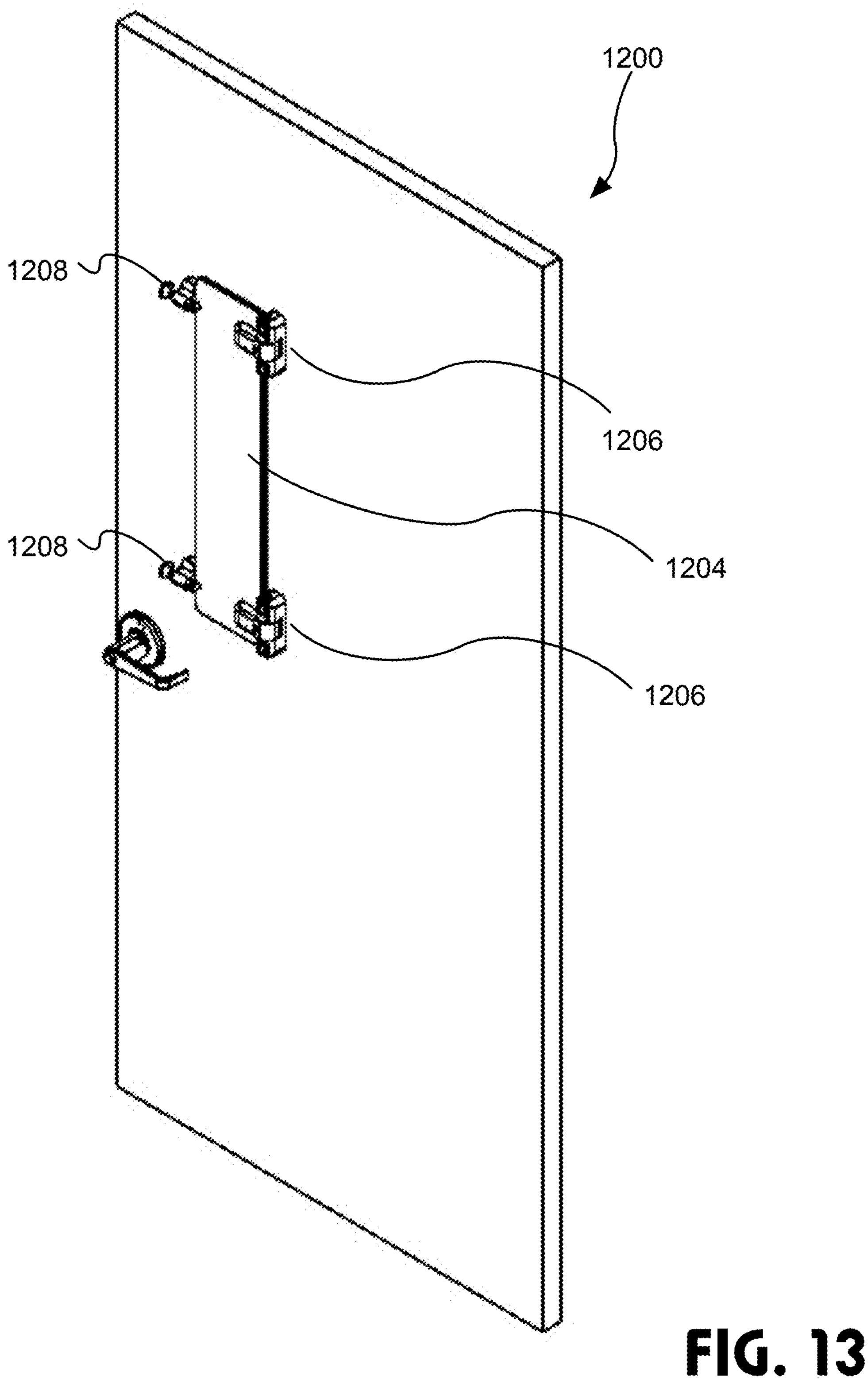
FIG. 13 illustrates the window covering plate of the solution positioned over the door window and secured and locked in place by the spring-loaded release devices.

FIG. 13 illustrates the window covering plate of the solution positioned over the door window and secured and locked in place by spring-loaded release devices. When the privacy panel 1204 is moved to the closed position as illustrated in FIG. 13, the window 1202 is covered and hence, cannot be seen in FIG. 13. The privacy panel 1204 is illustrated as being held in position with two spring-loaded release devices 1208.

Figure 14:
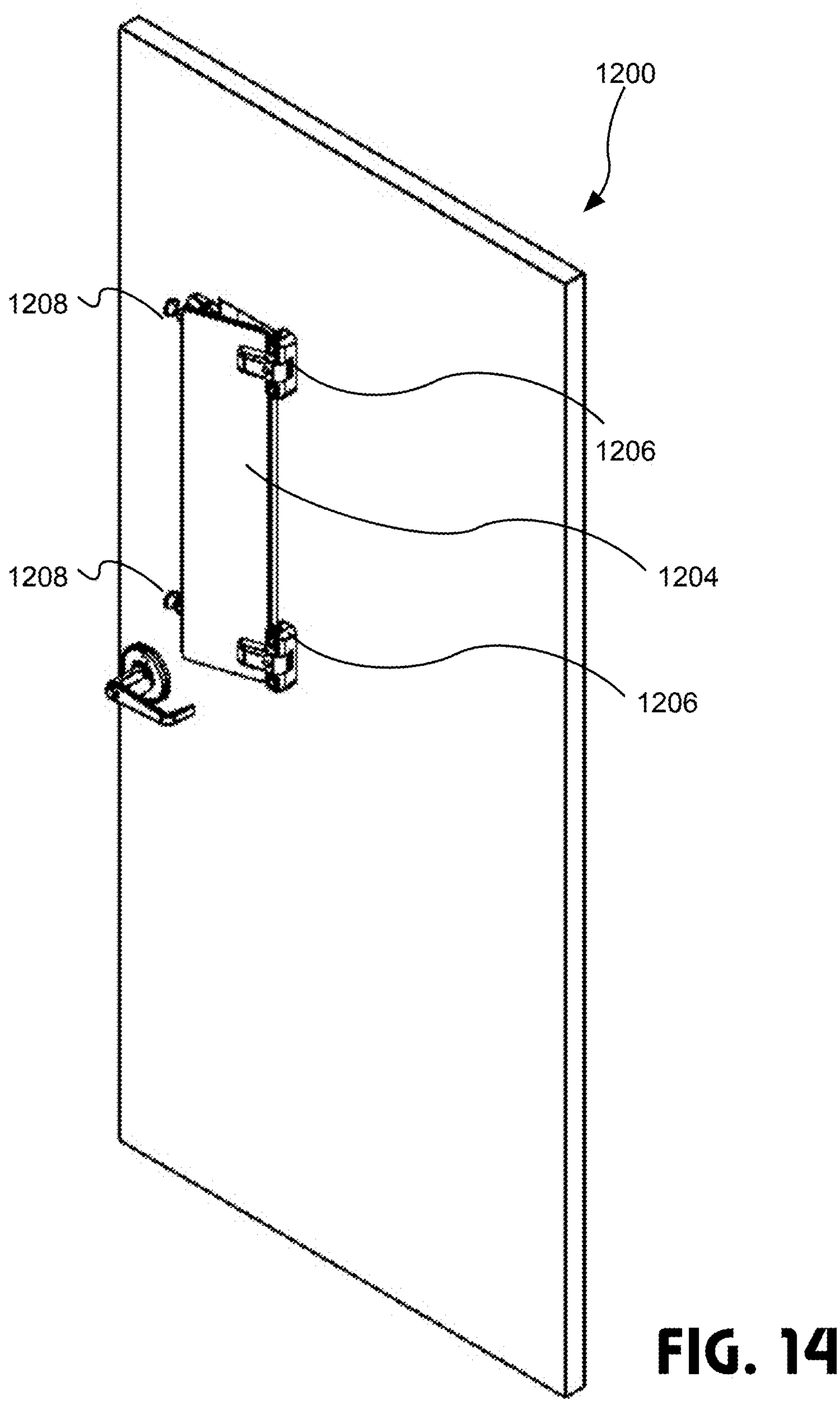
FIG. 14 illustrates the window covering plate of the solution in a popped state upon release of the spring-loaded release devices.

FIG. 14 illustrates the window covering plate of the solution in a popped state upon release of the spring-loaded release devices. In the popped state, the spring-loaded release devices have been activated and the privacy panel 1204 is moved to the illustrated ajar position by a spring-loaded push (best illustrated in FIGS. 27 and 28) or, if spring-loaded hinges are employed, the privacy panel 1204 will return to the state illustrated in FIG. 12.

Figure 15:
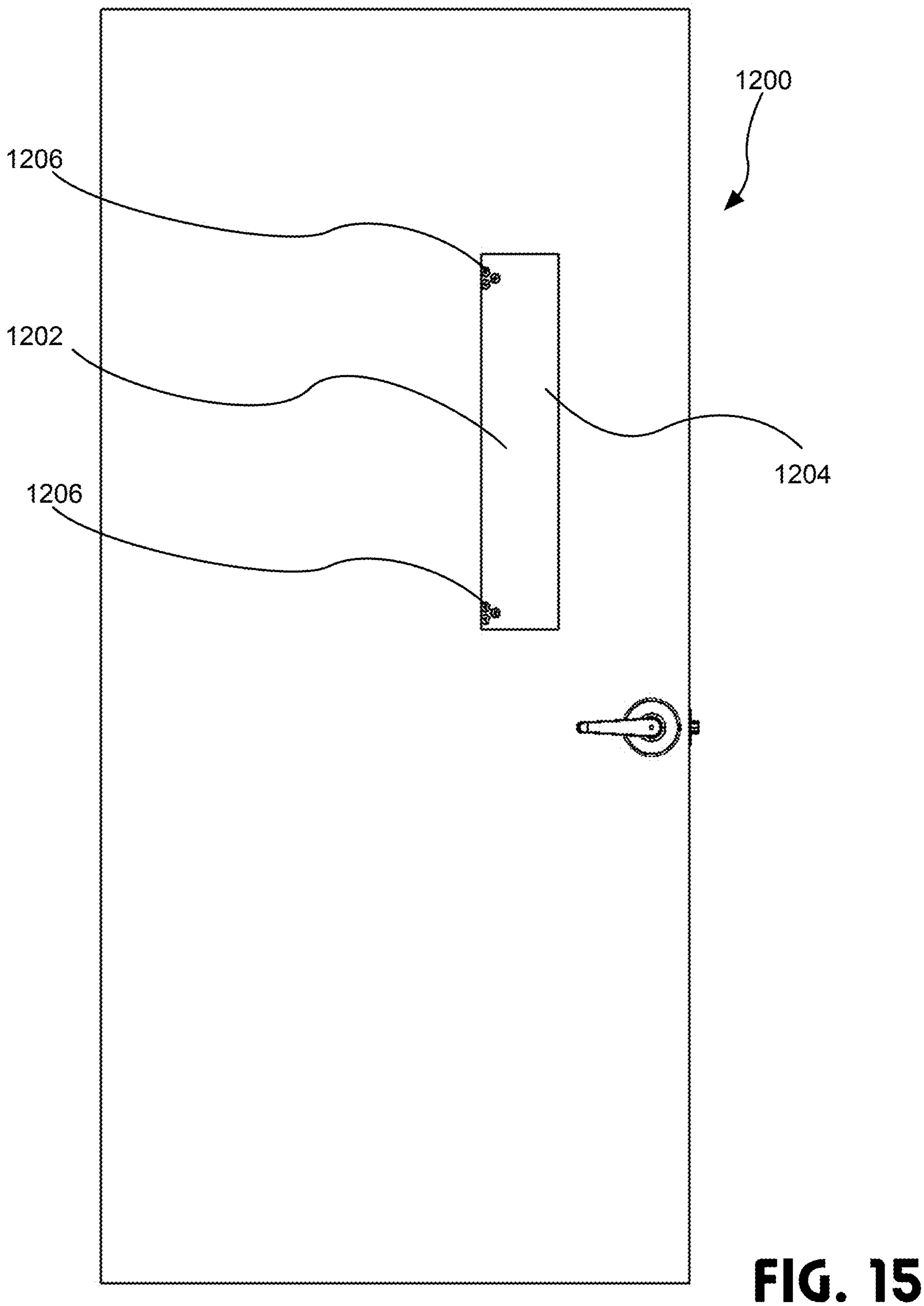
FIG. 15 illustrates the window covering plate of the solution as seen through the window of a door on the exterior side of the door.

FIG. 15 illustrates the window covering plate of the solution as seen through the window of a door on the exterior side of the door. In this illustration, the exterior surface of the door 1200 is being viewed. In the illustration, the window 1202 is visible to people on the exterior side of the door but, the privacy panel 1204 is in the deployed state and thus obstructing any view through the window.

Figure 16:
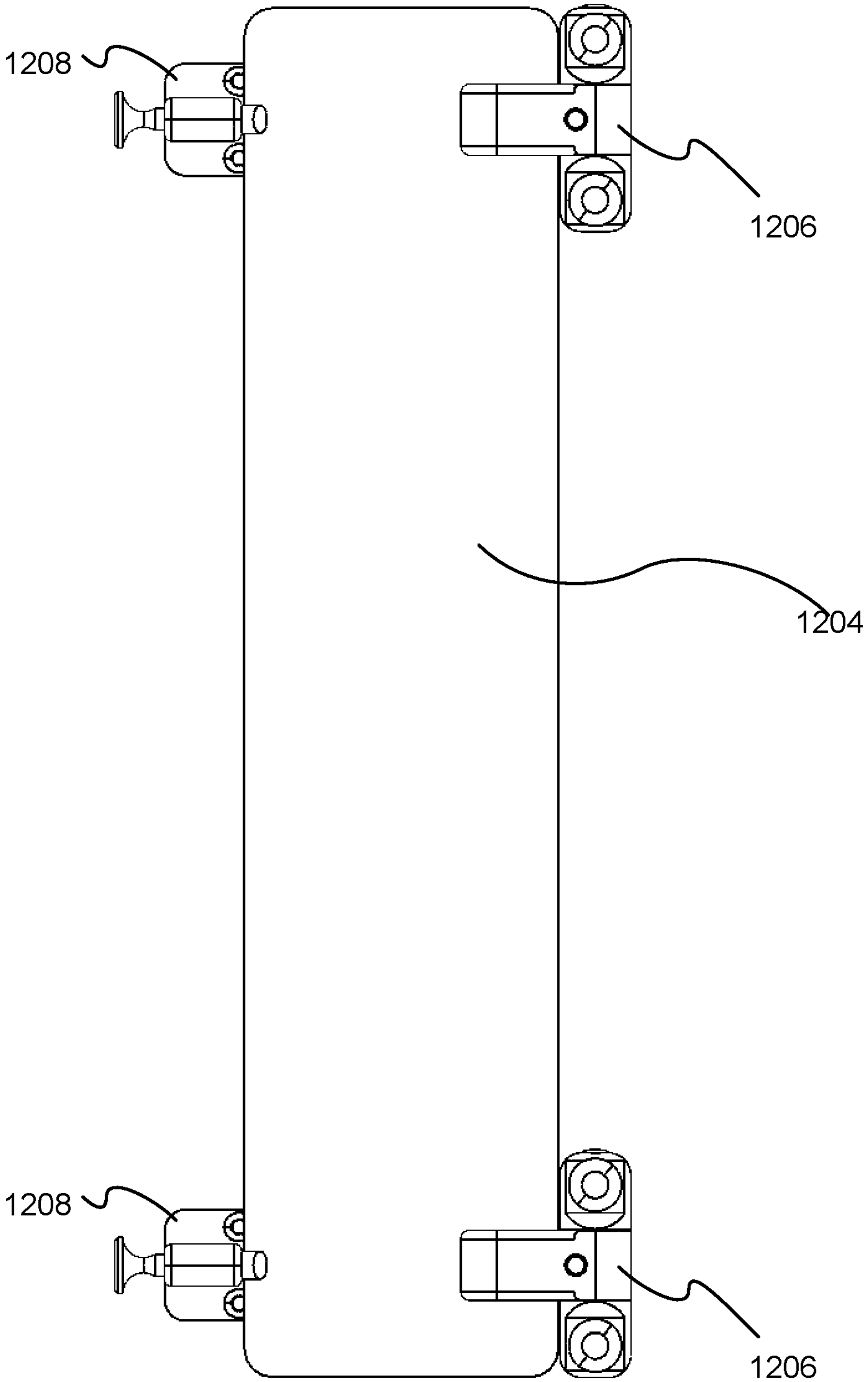
FIG. 16 is a front-side plan view of the window covering plate with its spring-loaded hinges and spring-loaded release devices, ready for mounting to a door next to a window.

FIG. 16 is a front-side plan view of the window covering plate with its hinges and spring-loaded release devices, ready for mounting to a door next to a window. In the illustration, the panel 1204 is shown as being in the deployed of closed state of FIG. 14 with the spring-loaded release device 1208 latching or holding the privacy panel 1204 in a closed state.

Figure 17:
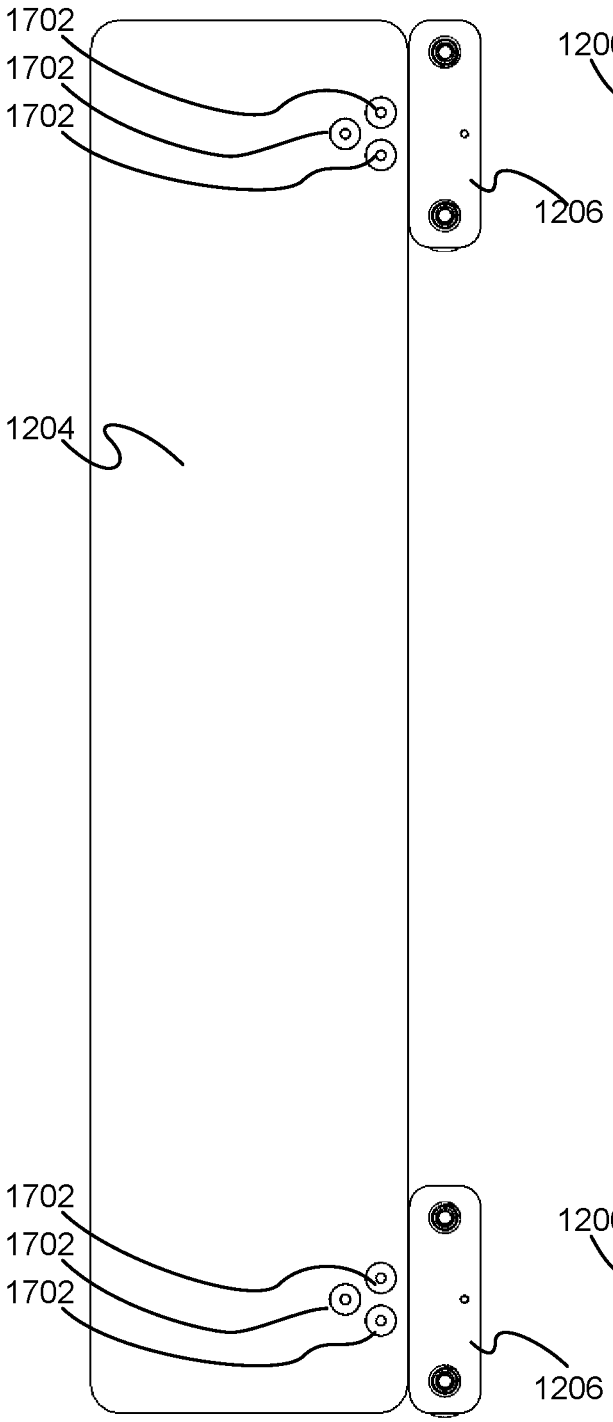
FIG. 17 is a back-side plan view of an exemplary embodiment window covering plate and exemplary hinges.

FIG. 17 is a back-side plan view of an exemplary embodiment window covering plate and exemplary hinges. The privacy panel 1204 is illustrated as including three apertures 1702 for each hinge 1208 through which screws or other attachment devices, such as rivets, bolts, etc, can be used to secure the hinge 1206 to the panel 1204. In addition each hinge 1206 also includes apertures for mounting the hinge 1206 or the window covering assembly to or through the interior side of the door 1200.

Figure 18:
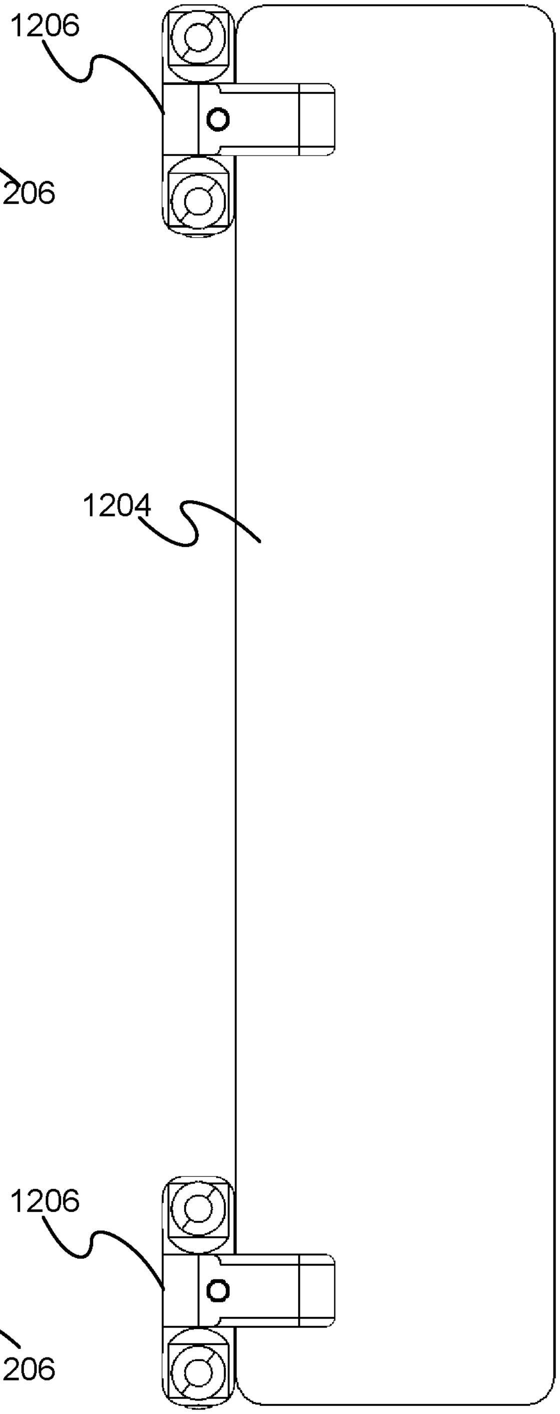
FIG. 18 is a front-side plan view of an exemplary embodiment of the window covering plate and exemplary hinges.

FIG. 18 is a front-side plan view of an exemplary embodiment of the window covering plate and exemplary hinges.

Figure 19:
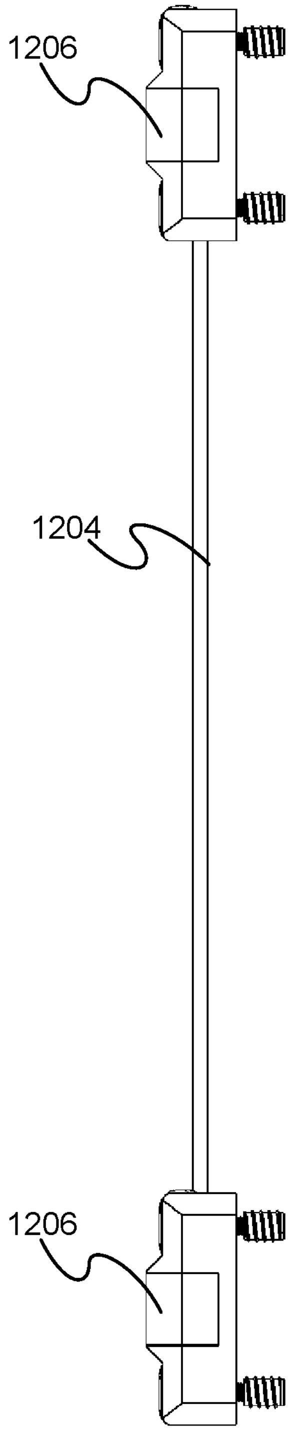
FIG. 19 is a right-side plan view of an exemplary embodiment of the window covering plate and exemplary hinges.

FIG. 19 is a right-side plan view of an exemplary embodiment of the window covering plate and exemplary hinges.

Figure 20:
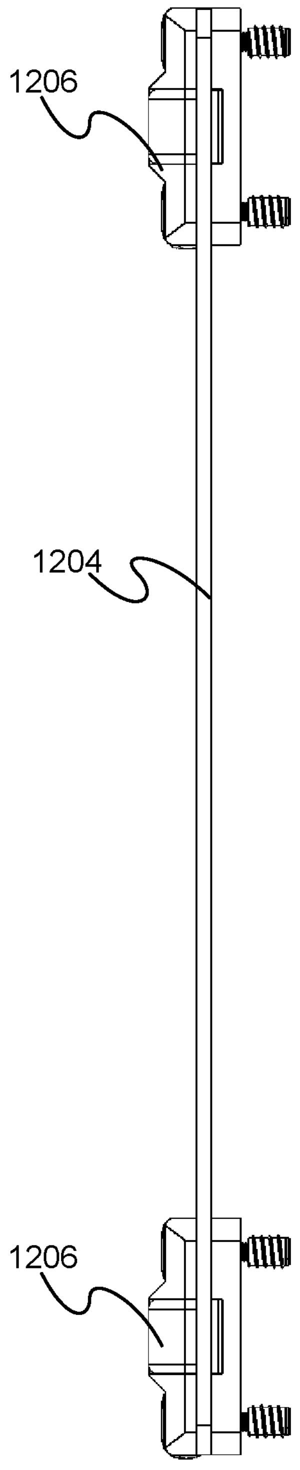
FIG. 20 is a left-side plan view of an exemplary embodiment of the window covering plate and exemplary hinges.

FIG. 20 is a left-side plan view of an exemplary embodiment of the window covering plate and exemplary hinges.

Figure 21:
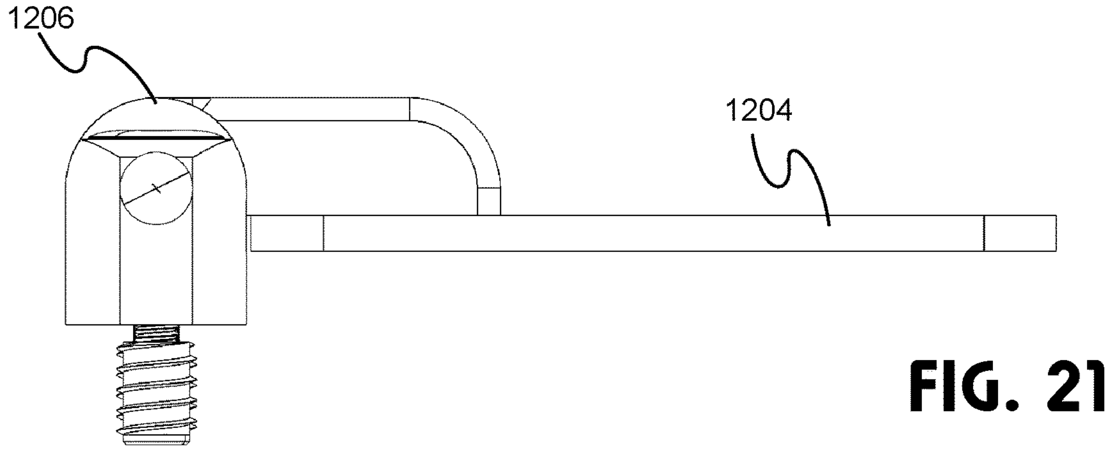
FIG. 21 is a top-side plan view of an exemplary embodiment of the window covering plate and exemplary hinges.

FIG. 21 is a top-side plan view of an exemplary embodiment of the window covering plate and exemplary hinges.

Figure 22:
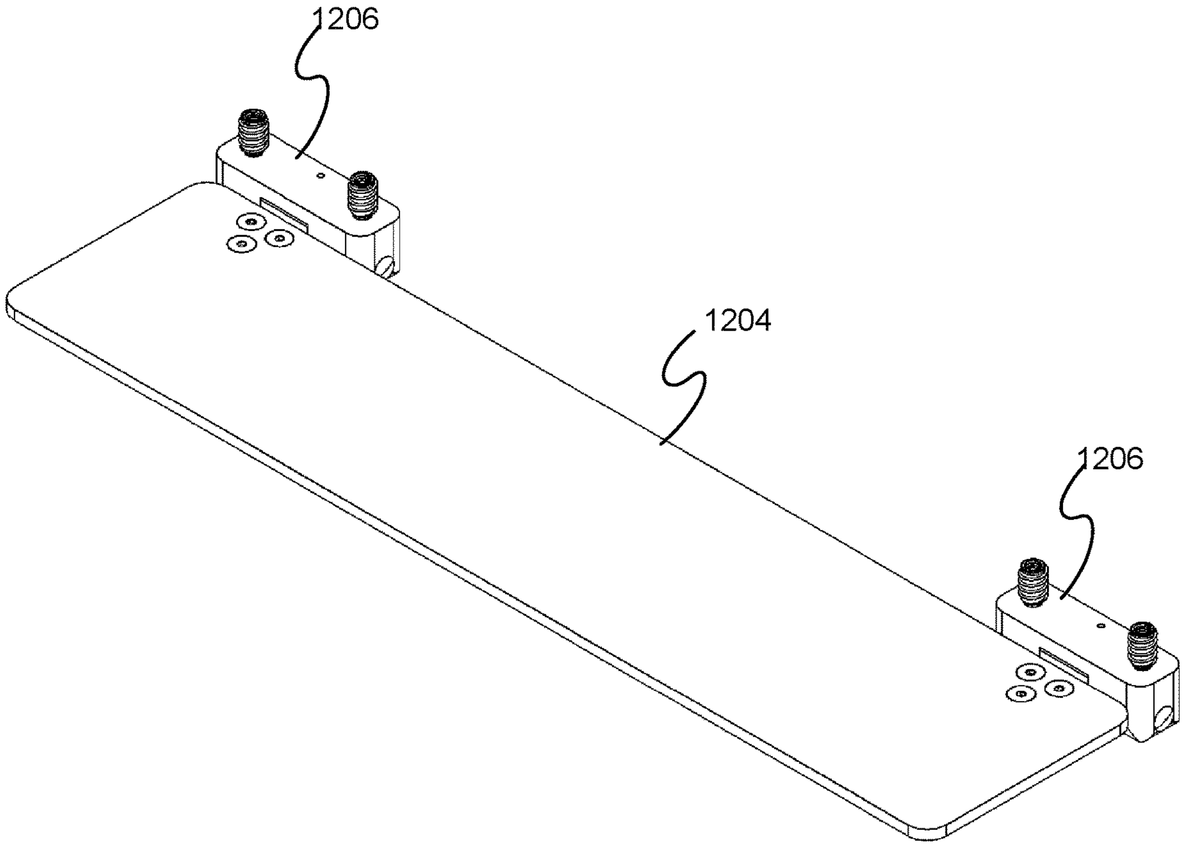
FIG. 22 is a bottom-side perspective view of an exemplary embodiment of the window covering plate and exemplary hinges.

FIG. 22 is a bottom-side perspective view of an exemplary embodiment of the window covering plate and exemplary hinges.

Figure 23:
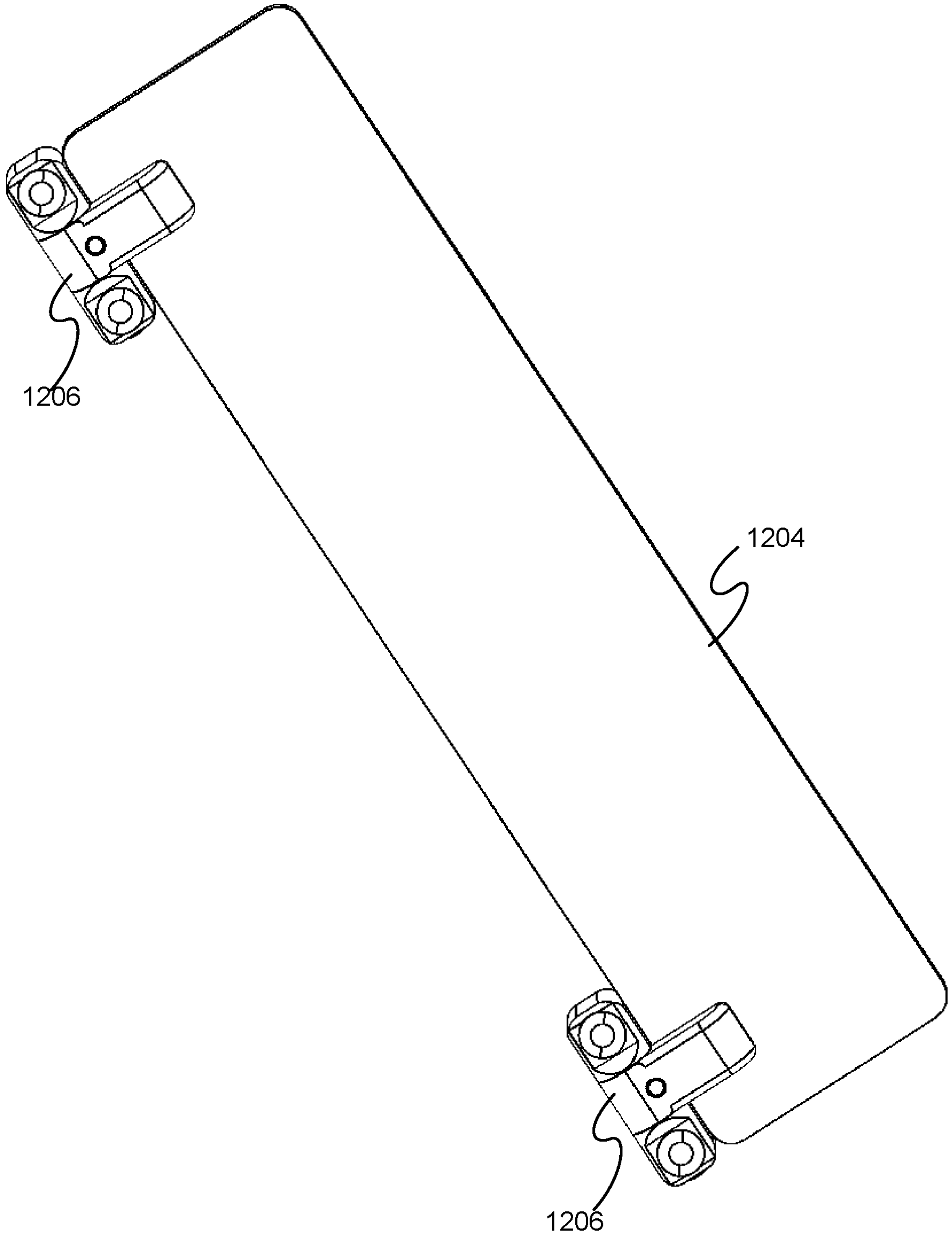
FIG. 23 is a top-side perspective view of an exemplary embodiment of the window covering plate and exemplary hinges.

FIG. 23 is a top-side perspective view of an exemplary embodiment of the window covering plate and exemplary hinges.

Figure 24:
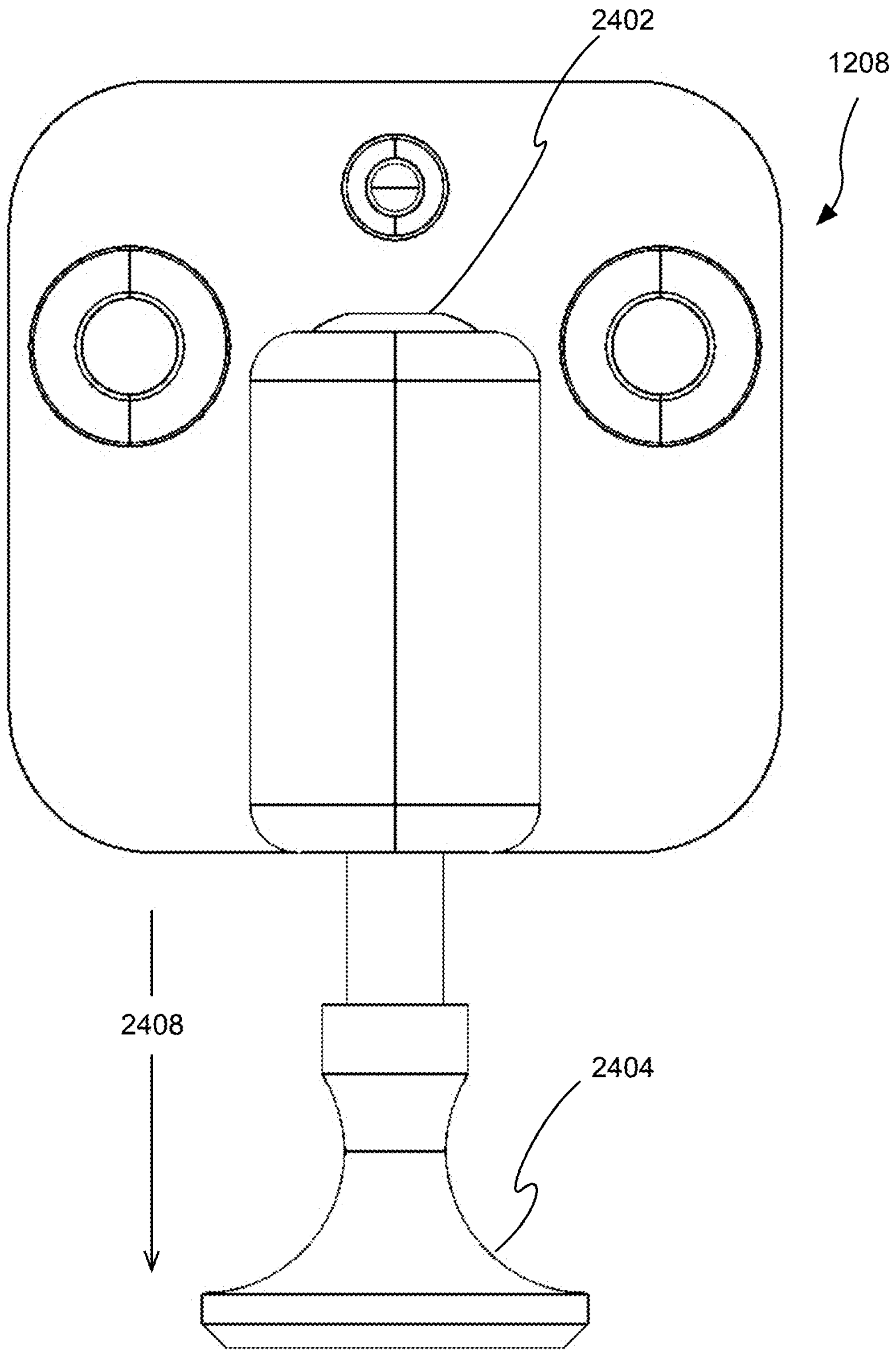
FIG. 24 is a top view of an exemplary spring-loaded release device suitable for various embodiments of the present invention illustrated with the bolt retracted for releasing of a window covering plate back to its fail-safe open default state.

FIG. 24 is a top view of an exemplary spring-loaded release device suitable for various embodiments of the present invention illustrated with the bolt retracted for releasing of a window covering plate back to its fail-safe open default state. The spring-loaded release device 1208 includes a bolt 2402 that has a resting or activated state of being extended (best shown in FIG. 29) and an open state of being withdrawn as illustrated in FIG. 24. To transition the bolt 2402 to the open state, a force is applied to plunger 2404 in the direction of arrow 2408. As the plunger 2404 is forced in the direction of arrow 2408, the bolt 2402 is retracted to the open position. Moving the plunger 2404 in the opposite direction causes the bolt 2402 to move to the activated or closed state.

Figure 25:
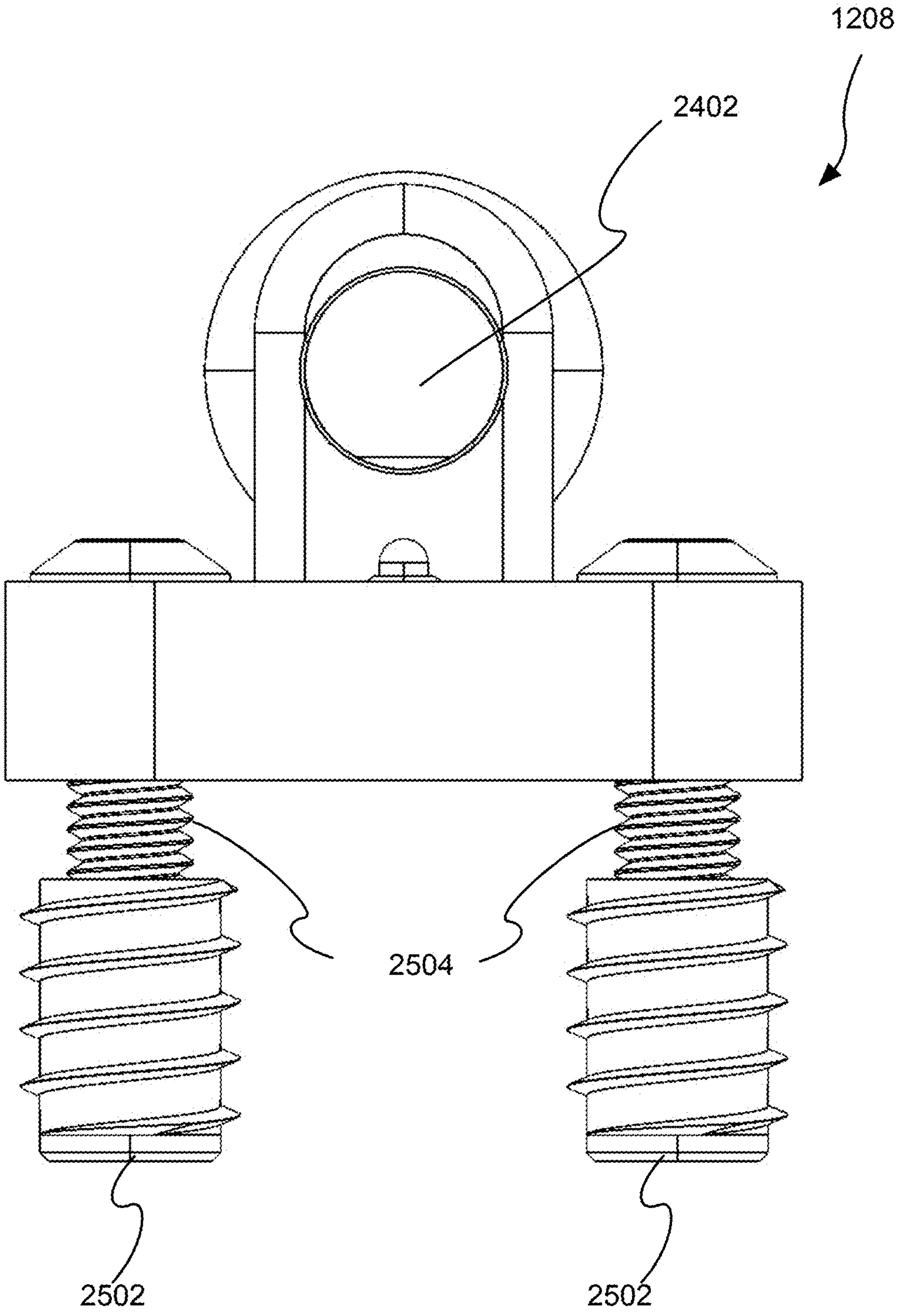
FIG. 25 is a front-side view of an exemplary spring-loaded release device suitable for various embodiments of the present invention illustrated with the bolt retracted for releasing of a window covering plate back to its fail-safe open default state.

FIG. 25 is a front-side view of an exemplary spring-loaded release device suitable for various embodiments of the present invention illustrated with the bolt retracted for releasing of a window covering plate back to its fail-safe open default state. The illustration shows an exemplary mounting mechanism for securing the spring-loaded release device 1208 to a door 1200. The spring-loaded release device 1208 includes one or more sinks 2502 and a bolt 2504 corresponding to each sink 2502. The sinks 2502 can be screwed into a hole in the interior surface of the door 1200 and then the bolt 2504 can be passed through an aperture in the spring-loaded release device 1208 and threaded into the sink 2502.

Figure 26:
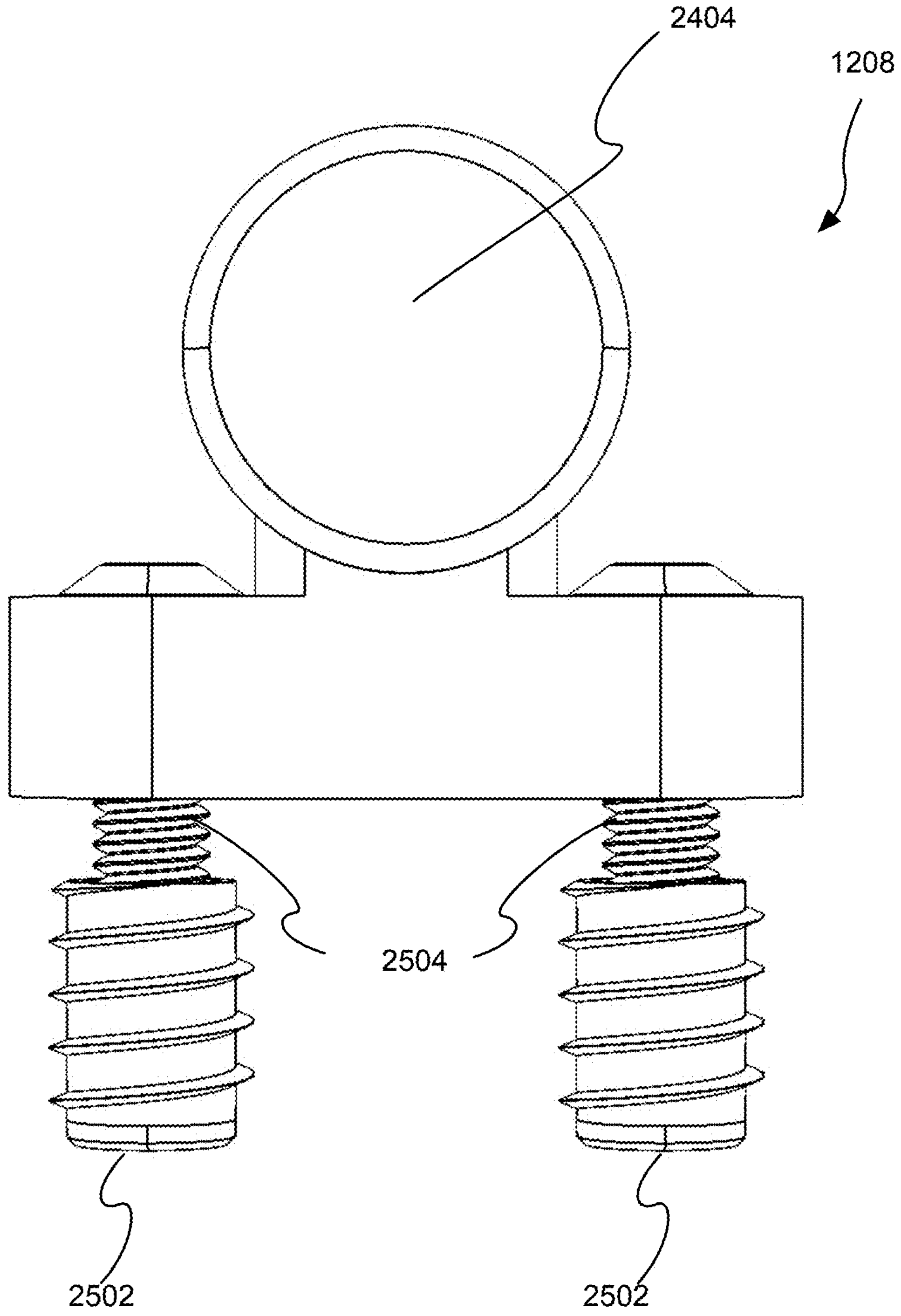
FIG. 26 is a back-side view of an exemplary spring-loaded release device suitable for various embodiments of the present invention.

FIG. 26 is a back-side view of an exemplary spring-loaded release device suitable for various embodiments of the present invention.

Figure 27:
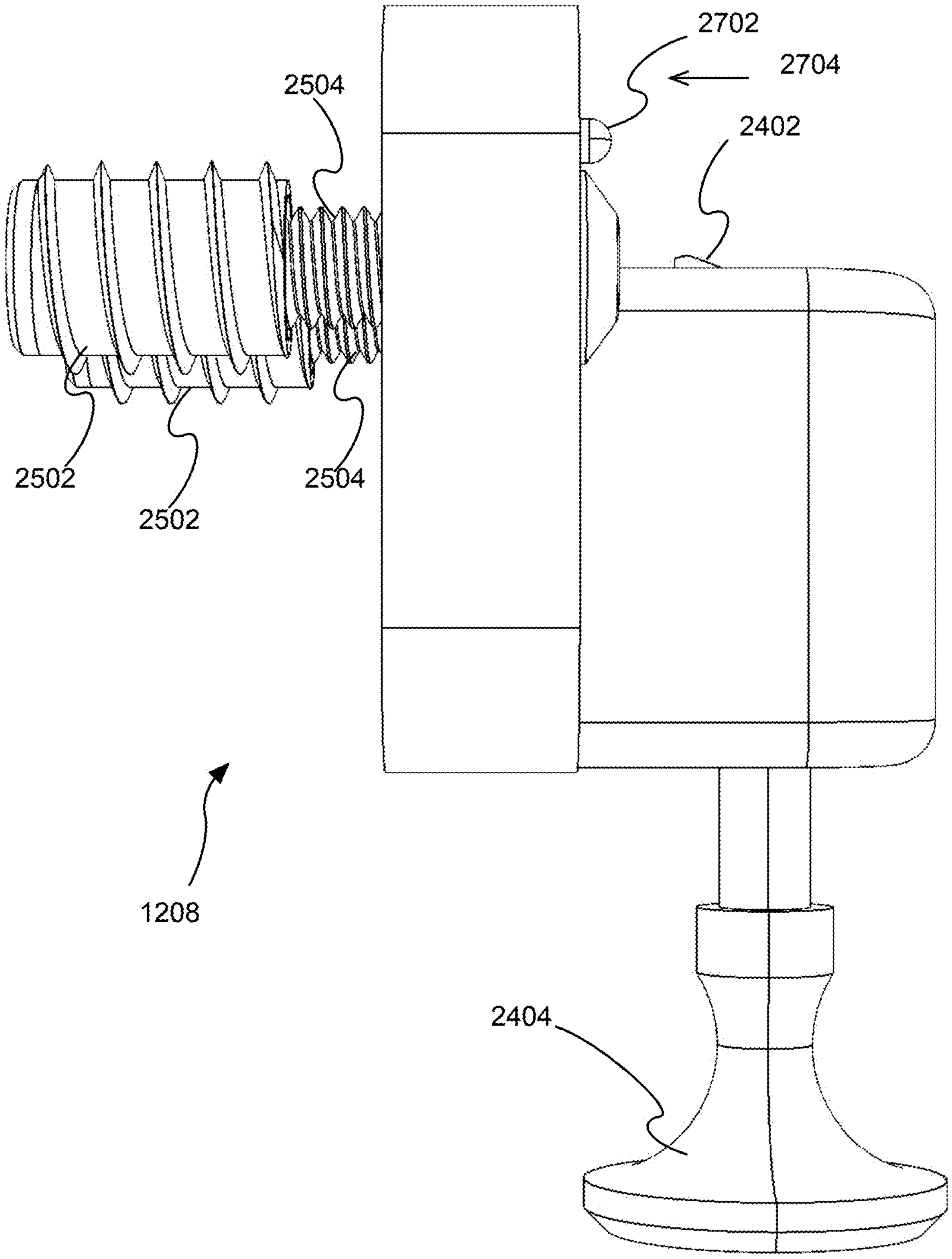
FIG. 27 is a left-side view of an exemplary spring-loaded release device suitable for various embodiments of the present invention illustrated with the bolt retracted for releasing of a window covering plate back to its fail-safe open default state, with the right-side view being a mirrored image.

FIG. 27 is a left-side view of an exemplary spring-loaded release device suitable for various embodiments of the present invention illustrated with the bolt retracted for releasing of a window covering plate back to its fail-safe open default state, with the right-side view being a mirrored image. The illustration shows a spring-loaded push 2702. The spring-loaded push 2702 is illustrated in its resting position. When a privacy panel is closed and the bolt 2402 transitions to the closed or activated position, the privacy panel 1202 is pushed against the spring-loaded push 2702 causing the spring-loaded push to be forced in the direction of arrow 2704. A spring, best seen in FIGS. 28 and 29 apply a force in the opposite direction and thus, when the bolt 2402 is retracted or opened, the spring-loaded push 2702 causes the privacy panel 1202 to transition to a popped state as illustrated in FIG. 14.

Figure 28:
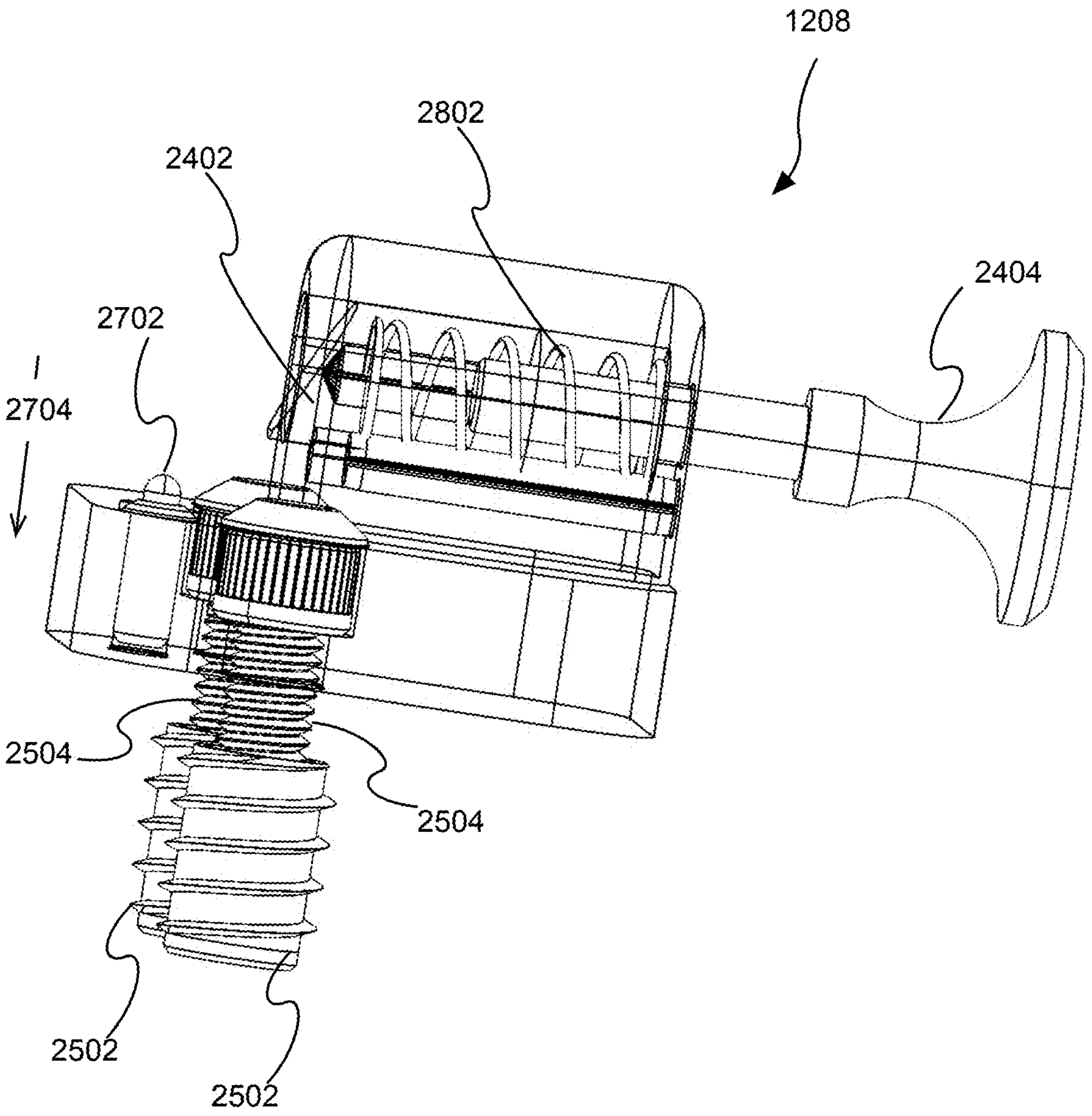
FIG. 28 is a left-side transparent view of an exemplary spring-loaded release device suitable for various embodiments of the present invention illustrated with the bolt retracted for releasing of a window covering plate back to its fail-safe open default state, with the right-side view being a mirrored image.

FIG. 28 is a left-side transparent view of an exemplary spring-loaded release device suitable for various embodiments of the present invention illustrated with the bolt retracted for releasing of a window covering plate back to its fail-safe open default state, with the right-side view being a mirrored image. FIG. 28 illustrates spring 2802 that is used to bias the plunger 2404 and the bolt 2402 into the closed or activated position (as illustrated in FIG. 29).

Figure 29:
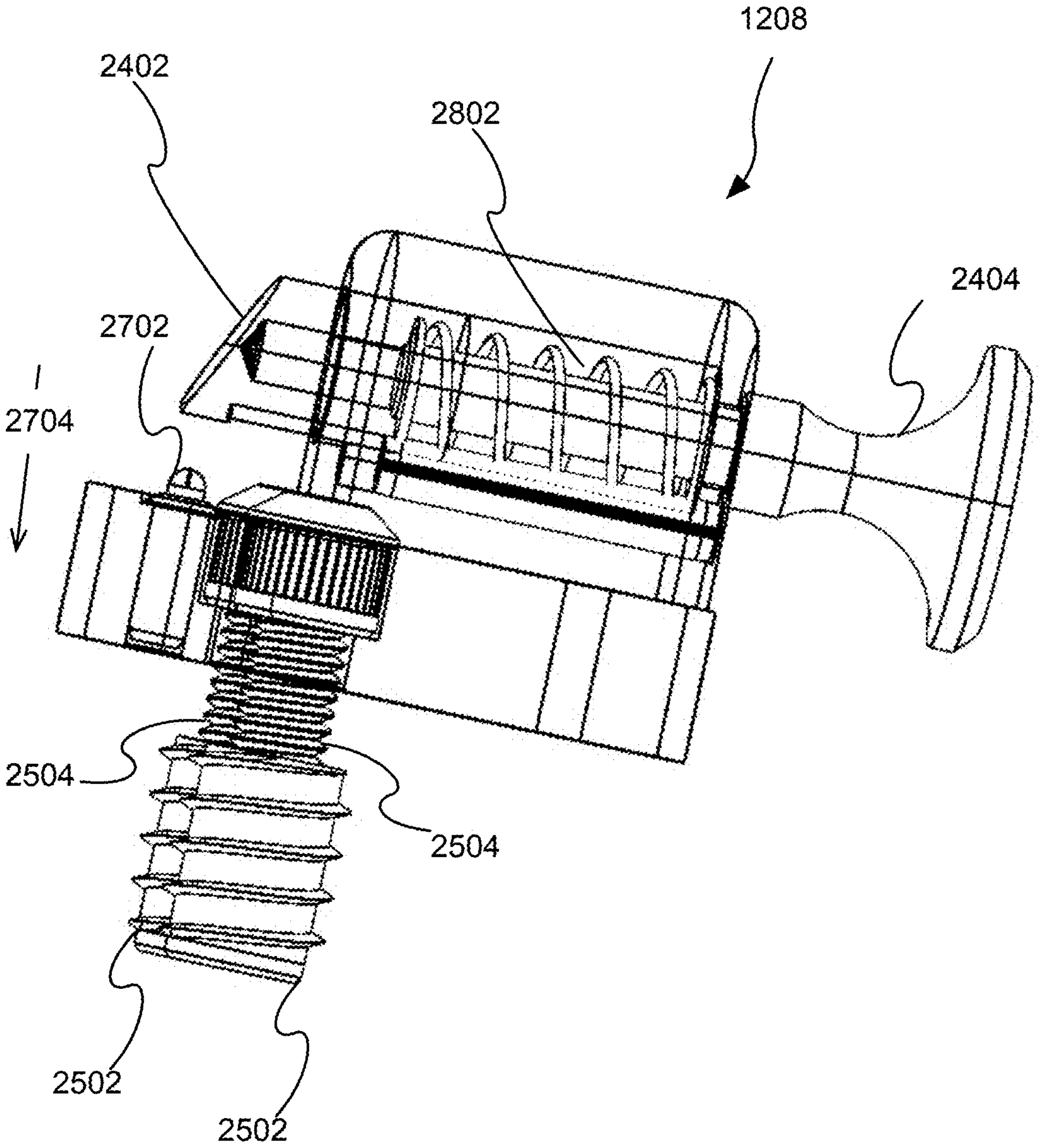
FIG. 29 is a left-side transparent view of an exemplary spring-loaded release device suitable for various embodiments of the present invention illustrated with the bolt extended for securing of a window covering plate over a door window, with the right-side view being a mirrored image.

FIG. 29 is a left-side transparent view of an exemplary spring-loaded release device suitable for various embodiments of the present invention illustrated with the bolt extended for securing of a window covering plate over a door window, with the right-side view being a mirrored image.

In the various embodiments, the privacy panel can be constructed of different materials according to the risks that are being addressed. In one embodiment, the privacy panel can be constructed of bulletproof glass, ballistic glass, transparent armor or bullet-resistant glass. While such materials may not be 100% impenetrable, they provide substantial protection. In general, such material can be constructed from a combination of two or more types of glass, one hard and one soft. The softer layer makes the glass more elastic, so that it can flex instead of shatter. The index of refraction for all of the glasses used in the bulletproof layers must be almost the same to keep the glass transparent and allow a clear, undistorted view through the glass.

Bullet-resistant glass is constructed using layers of laminated glass. The more layers there are, the more protection the glass offers. When a weight reduction is needed, polycarbonate (a thermoplastic) is laminated onto the safe side to stop spall. The aim is to make a material with the appearance and clarity of standard glass but with effective protection from small arms. Polycarbonate designs usually consist of products such as Armormax, Makroclear, Cyrolon: a soft coating that heals after being scratched (such as elastomeric carbon-based polymers) or a hard coating that prevents scratching (such as silicon-based polymers).

The plastic in laminate designs also provides resistance to impact from physical assault from blunt and sharp objects. The plastic provides little in the way of bullet-resistance. The glass, which is much harder than plastic, flattens the bullet, and the plastic deforms, with the aim of absorbing the rest of the energy and preventing penetration. The ability of the polycarbonate layer to stop projectiles with varying energy is directly proportional to its thickness, and bulletproof glass of this design may be up to 3.5 inches thick.

In some applications it is desirous to ensure that when the privacy panel is closed, the interior of the area cannot be viewed through the window. In such situations an opaque material can be utilized. Further, the opaque material can range from a variety of materials including plastics, wood, metal, composites, etc. Another opaque material that may provide safety from projectiles is Kevlar or Para-aramid. Kevlar is a strong, heat-resistant synthetic fiber, related to other aramids such as Nomex and Technora. It is typically spun into ropes or fabric sheets that can be used as such, or as an ingredient in composite material components.

Kevlar has many applications, ranging from bicycle tires and racing sails to bulletproof vests, all due to its high tensile strength-to-weight ratio; by this measure it is five times stronger than steel.

It should be appreciated that other clear, opaque, tamper proof, fireproof and bullet proof or resistant materials may also be utilized.

In some embodiments, it may be desired to view the exterior of a room through the window but to prevent others from being able to view into the room. In such applications, a one way mirror can be utilized for the privacy panel. In addition, a one-way mirror along with bullet proof glass may also be utilized.

In addition, in some embodiments it may be desired to allow entities in the interior of a space to view the exterior area but, to still maintain the highest level of bullet or projectile penetration. In such embodiments, the panel can be constructed from a bullet-proof material and only a small portion or window within the panel can be constructed from a transparent material. Further, in some embodiments with window or small portion may be a peep-hole style viewing device. It should be appreciated that such window or peephole maybe utilized in any of the embodiments of the privacy panel.

It should also be appreciated that while the spring-loaded hinges have been described as being biased towards the security panel being moved to the open position, the spring-loaded hinges may also be biased to the closed position. In such embodiments, the spring-loaded release devices may be secured to the door such that they align with the privacy panel when it is in the opened position and operate to keep the privacy panel in the open state. Once the spring-loaded hinges are released, the privacy panel, under the influence of the spring-loaded hinges would then snap into the closed state. It should be appreciated that spring-loaded release devices may be used to secure the privacy panel in both the open and closed state.

In some embodiments, rather than a hinged privacy panel, a sliding privacy panel can be utilized. In such embodiments slide tracks above and below the window can be used to guide the privacy panel from an open to closed position and vice versa. It should be further appreciated that the sliding privacy panel may also utilize spring-loaded elements to bias the privacy panel in a closed and/or open position. Further, spring-loaded release devices may also be utilized to secure the privacy panel in the open and/or closed position.

Still in other embodiments, the privacy panel may be hingedly attached to the top of the window or opening and secured into the open position with a latching device. Upon releasing of the latching device, the privacy panel may naturally fall into a closed position under the influence of gravity. In yet other embodiments, the privacy panel may be hingedly attached to the bottom of the window or opening and secured into the closed position with a latching device. Upon releasing of the latching device, the privacy panel may naturally fall into an open position under the influence of gravity.

As previously described for the security device, the privacy pane assembly can be activated either manually, electronically and automatically in response to the detection of a potential threat. The security devices and the privacy panels can be controlled from a building wide system or from a more granular system, such as per floor, per room, etc. For instance, if a system detects sounds that can be construed as gun shots, the system can detect the location of the threat and automatically trigger controls to cause the security devices and privacy devices to be deployed. Further, for mechanically activated systems, a single actuator may be used that once actuated causes both the security device and the privacy device for a door to be activated.

Also, as previously described with relation to the security device, the privacy panel can also include a release mechanism on the exterior of the door to allow authorized individuals to disengage the privacy panel. Advantageously, this feature can allow rescue workers to assess the interior of a space to determine if a rescue is needed, to identify hazardous conditions, to identify if perpetrators have penetrated into the space, etc. In the embodiments in which the spring-loaded release device are used to secure the privacy panel in a closed position and in which the spring-loaded hinge devices bias the privacy panel towards an open position, the privacy panel assembly may include a physical release accessible and operational with a special key or tool that can be extended through an aperture defined by the door, or an electronic means can utilize a signal to disengage the spring-loaded release devices such that the privacy panel can return to the open position.

Systems and methods of use for a new and useful door security device and/or privacy panel device have been described using detailed descriptions of embodiments thereof that are provided by way of example and are not intended to limit the scope of the disclosure. The described embodiments comprise different features, not all of which are required in all embodiments of the solution. Some embodiments of the solution utilize only some of the features or possible combinations of the features. Variations of embodiments of the solution that are described and embodiments of the solution comprising different combinations of features noted in the described embodiments will occur to persons of the art. It will be appreciated by persons skilled in the art that a hinge-side door security device according to the solution is not limited by what has been particularly shown and described herein above. Rather, the scope of the disclosed solution is defined by the claims that follow.

What is claimed is:

1. A privacy panel system for covering a window in a door, the privacy panel system comprising:

one or more spring-loaded hinges mounted to an interior surface of the door and proximate to a first side of the window defined within the door;

a window covering plate attached to the one or more spring-loaded hinges such that the window covering plate is operable to move from a first position substantially parallel to the interior surface of the door and a second position substantially parallel to and covering the window, wherein the one or more spring-loaded hinges are biased to a "fail-open" state associated with said first position of the window covering plate; and one or more spring-loaded release devices mounted to the interior surface of the door and proximate to a second side of the window, wherein;

each of the one or more spring-loaded release devices comprise a bolt that is biased to an extended position by a spring; and when the window covering plate is rotated to said second position, said bolts of the one or more spring-loaded release devices retract from said extended position to receive the window covering plate and then reextend to hold it in the second position to thereby prevent the spring-loaded hinges from returning the window covering plate to the first position unless or until the one or more spring-loaded release devices are actuated to retract said bolts.

2. The device of claim 1, wherein the window covering plate is constructed of bullet proof material.

3. The device of claim 1, wherein the window covering plate includes a one-way mirror to allow occupants of a room to which the door provides access to see through the window covering plate when it is in said second position.

* * * * *